(12) United States Patent
Knudson et al.

(10) Patent No.: US 6,526,577 B1
(45) Date of Patent: *Feb. 25, 2003

(54) ENHANCED INTERACTIVE PROGRAM GUIDE

(75) Inventors: Edward B. Knudson, Littleton, CO (US); Joel G. Hassell, Arvada, CO (US); Michael D. Ellis, Boulder, CO (US); Pamela L. McKissick, Tulsa, OK (US)

(73) Assignee: United Video Properties, Inc., Tulsa, OK (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/444,882

(22) Filed: Nov. 22, 1999

Related U.S. Application Data

(60) Provisional application No. 60/110,491, filed on Dec. 1, 1998.

(51) Int. Cl.[7] .............................................. H04N 5/445
(52) U.S. Cl. .............................. 725/40; 725/39; 725/42; 725/43
(58) Field of Search ................................ 348/906, 7, 9, 348/1; 345/327, 781, 789, 800, 808; 725/39, 40, 42, 87, 41

(56) References Cited

U.S. PATENT DOCUMENTS

| 3,891,792 A | 6/1975 | Kimura ........................ 178/5.8 |
| 4,134,127 A | 1/1979 | Campioni ..................... 358/16 |
| 4,139,860 A | 2/1979 | Micic et al. ................... 358/22 |
| 4,344,090 A | 8/1982 | Belisomi et al. ............. 358/183 |
| 4,488,179 A | 12/1984 | Krüger et al. ............... 358/181 |
| 4,706,121 A | 11/1987 | Young ......................... 358/142 |

(List continued on next page.)

FOREIGN PATENT DOCUMENTS

| EP | 0 532 322 | 3/1993 | .......... H04N/5/445 |

(List continued on next page.)

OTHER PUBLICATIONS

"Interface Device for Conventional TVs to Improve Functionality," IBM Technical Disclosure Bulletin, vol. 36, No. 7, Jul. 1993, pp. 53–54.

(List continued on next page.)

*Primary Examiner*—Andrew Faile
*Assistant Examiner*—Kieu-Oanh Bui
(74) *Attorney, Agent, or Firm*—Fish & Neave; Richard M. Feustel, Jr.; Evelyn C. Mak

(57) ABSTRACT

An interactive television program guide system and method in which functions that have not been provided before by other interactive television program guide systems is provided. The interactive guide may, for example, provide users with an opportunity to preview pay-per-view programs before ordering. The guide may, for example, display a pay-per-view program preview in a video window. The video window may occupy a portion of the screen. If desired, a video window of the video from the currently tuned to channel may be displayed simultaneously in a second video window. In response to the user ordering a previewed pay-per-view program, the interactive guide may explode the pay-per-view program preview window into a full-screen video.

24 Claims, 25 Drawing Sheets

U.S. PATENT DOCUMENTS

| | | | | |
|---|---|---|---|---|
| 4,751,578 | A | 6/1988 | Reiter et al. | 358/183 |
| 4,787,063 | A | 11/1988 | Muguet | 364/900 |
| 4,821,102 | A | 4/1989 | Ichikawa et al. | 358/183 |
| 4,905,094 | A | 2/1990 | Pocock et al. | 358/342 |
| 4,963,994 | A | 10/1990 | Levine | 358/335 |
| 4,977,455 | A | 12/1990 | Young | 358/142 |
| 4,991,011 | A | 2/1991 | Johnson et al. | 358/141 |
| 5,027,400 | A | 6/1991 | Baji et al. | 380/20 |
| 5,038,211 | A | 8/1991 | Hallenbeck | 358/142 |
| 5,047,867 | A | 9/1991 | Strubbe et al. | 358/335 |
| 5,151,789 | A | 9/1992 | Young | 358/194.1 |
| 5,206,722 | A | 4/1993 | Kwan | 358/86 |
| 5,210,611 | A | 5/1993 | Yee et al. | 358/191.1 |
| 5,231,493 | A | 7/1993 | Apitz | 358/146 |
| 5,237,417 | A | 8/1993 | Hayashi et al. | 358/183 |
| 5,253,066 | A | 10/1993 | Vogel | 358/188 |
| 5,299,006 | A | 3/1994 | Kim | 348/571 |
| 5,353,121 | A | 10/1994 | Young et al. | 348/563 |
| 5,357,276 | A | 10/1994 | Banker et al. | 348/7 |
| 5,404,393 | A | 4/1995 | Remillard | 379/96 |
| 5,412,720 | A | 5/1995 | Hoarty | 380/15 |
| 5,465,385 | A | 11/1995 | Ohga et al. | 455/6.1 |
| 5,477,262 | A | 12/1995 | Banker et al. | 348/7 |
| 5,479,268 | A * | 12/1995 | Young et al. | 358/335 |
| 5,485,221 | A | 1/1996 | Banker et al. | 348/563 |
| 5,502,504 | A | 3/1996 | Marshall et al. | 348/565 |
| 5,557,338 | A * | 9/1996 | Maze et al. | 348/565 |
| 5,559,548 | A * | 9/1996 | Davis et al. | 348/6 |
| 5,559,549 | A | 9/1996 | Hendricks et al. | 348/6 |
| 5,589,892 | A * | 12/1996 | Knee et al. | 348/731 |
| 5,592,551 | A | 1/1997 | Lett et al. | 380/20 |
| 5,594,509 | A * | 1/1997 | Florin et al. | 348/731 |
| 5,600,364 | A * | 2/1997 | Hendricks et al. | 348/1 |
| 5,600,573 | A | 2/1997 | Hendricks et al. | 364/514 |
| 5,619,249 | A * | 4/1997 | Billock et al. | 348/7 |
| 5,659,350 | A * | 8/1997 | Hendricks et al. | 348/6 |
| 5,682,195 | A | 10/1997 | Hendricks et al. | 348/6 |
| 5,710,601 | A | 1/1998 | Marshall et al. | 348/564 |
| 5,734,853 | A | 3/1998 | Hendricks et al. | 395/352 |
| 5,751,282 | A | 5/1998 | Girard et al. | 345/327 |
| 5,752,160 | A | 5/1998 | Dunn | 455/5.1 |
| 5,781,227 | A | 7/1998 | Goode et al. | 348/7 |
| 5,781,246 | A | 7/1998 | Alten et al. | 348/569 |
| 5,793,412 | A | 8/1998 | Asamizuya | 348/7 |
| 5,793,971 | A | 8/1998 | Fujita et al. | 395/200.49 |
| 5,805,154 | A | 9/1998 | Brown | 345/327 |
| 5,907,323 | A * | 5/1999 | Lawler et al. | 345/327 |
| 5,945,987 | A * | 8/1999 | Dunn | 345/327 |
| 6,002,394 | A * | 12/1999 | Schein et al. | 345/327 |

FOREIGN PATENT DOCUMENTS

| | | | |
|---|---|---|---|
| EP | 0 624 039 A2 | 11/1994 | H04N/7/173 |
| JP | 60-61935 | 4/1985 | G11B/15/02 |
| WO | WO 89/12370 | 12/1989 | N04N/7/167 |
| WO | WO 90/01243 | 2/1990 | H04N/7/18 |
| WO | WO 93/11638 | 6/1993 | H04N/7/16 |
| WO | WO 93/11639 | 6/1993 | H04N/7/16 |
| WO | WO 93/11640 | 6/1993 | H04N/7/16 |
| WO | WO 95/01058 | 1/1995 | H04N/7/16 |
| WO | WO 95/32583 | 11/1995 | H04N/5/445 |
| WO | WO 95/32585 | 11/1995 | H04N/7/10 |
| WO | WO 96/09721 | 3/1996 | H04N/7/025 |
| WO | WO 97/34414 | 9/1997 | H04N/5/45 |
| WO | WO 97/42763 | 11/1997 | H04N/7/173 |
| WO | WO 97/49242 | 12/1997 | H04N/7/10 |
| WO | WO 98/06219 | 2/1998 | H04N/7/10 |
| WO | WO 98/18260 | 4/1998 | H04N/7/173 |
| WO | WO 98/19459 | 5/1998 | H04N/7/167 |
| WO | WO 98/27723 | 6/1998 | H04N/5/445 |
| WO | WO 98/31115 | 7/1998 | |
| WO | WO 98/31116 | 7/1998 | |

OTHER PUBLICATIONS

Mannes, George, "Smart Screens; Development of Personal Navigation Systems for TV Viewers," Video Magazine, Dec. 1993.

Prevue Guide Brochure, Spring 1994.

"Addressable Converters: A New Development at Cable-Data," *Via Cable*, vol. 1, No. 12 (Dec. 1981).

James Sorce et al., "Designing a Broadband Residential Entertainment Service: A Case Study," 13th International Symposium Human Factors in Telecommunications, Torino, Italy, Sep. 10–14, 1990 pp. 141–148.

Vito Brugliera, "Digital On–Screen Display—A New Technology for the Consumer Interface, " *Symposium Record Cable Sessions*, 18th International Television Symposium and Technical Exhibition, Montreux, Switzerland 10–15 Jun. 1993, pp. 571–586 (Jun. 11, 1993).

CableData brochure, "A New Approach To Addressability" (undated).

Yee–Hsiang Chang et al., "An Open–Systems Approach to Video on Demand," *IEEE Communications Magazine*, vol. 32, pp. 68–80 (May 1994).

Matthew D. Miller, "A Scenario for the Deployment of Interactive Multimedia Cable Television Systems in the United States in the 1990's," *Proceedings of the IEEE*, vol. 82, No. 4, pp. 585–589 (Apr. 1994).

* cited by examiner

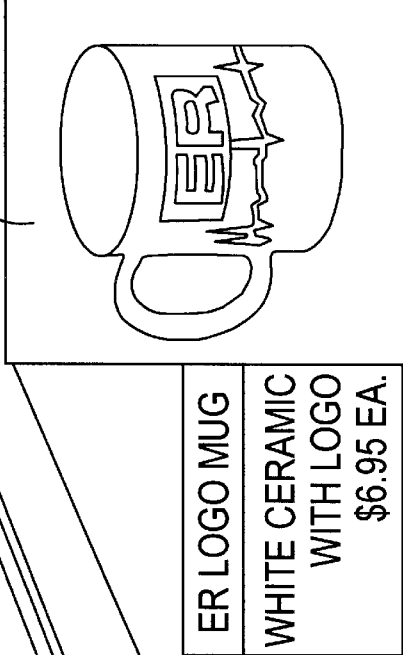
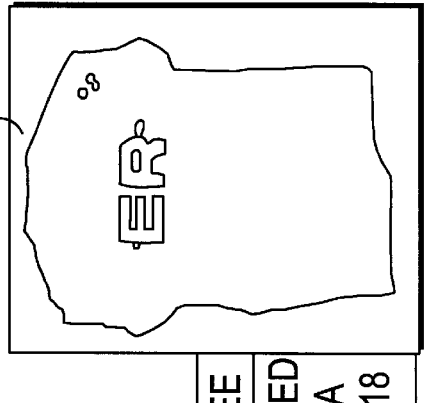
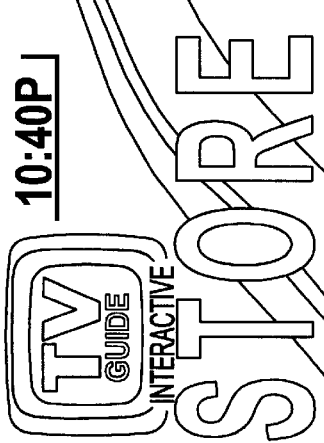
FIG. 14

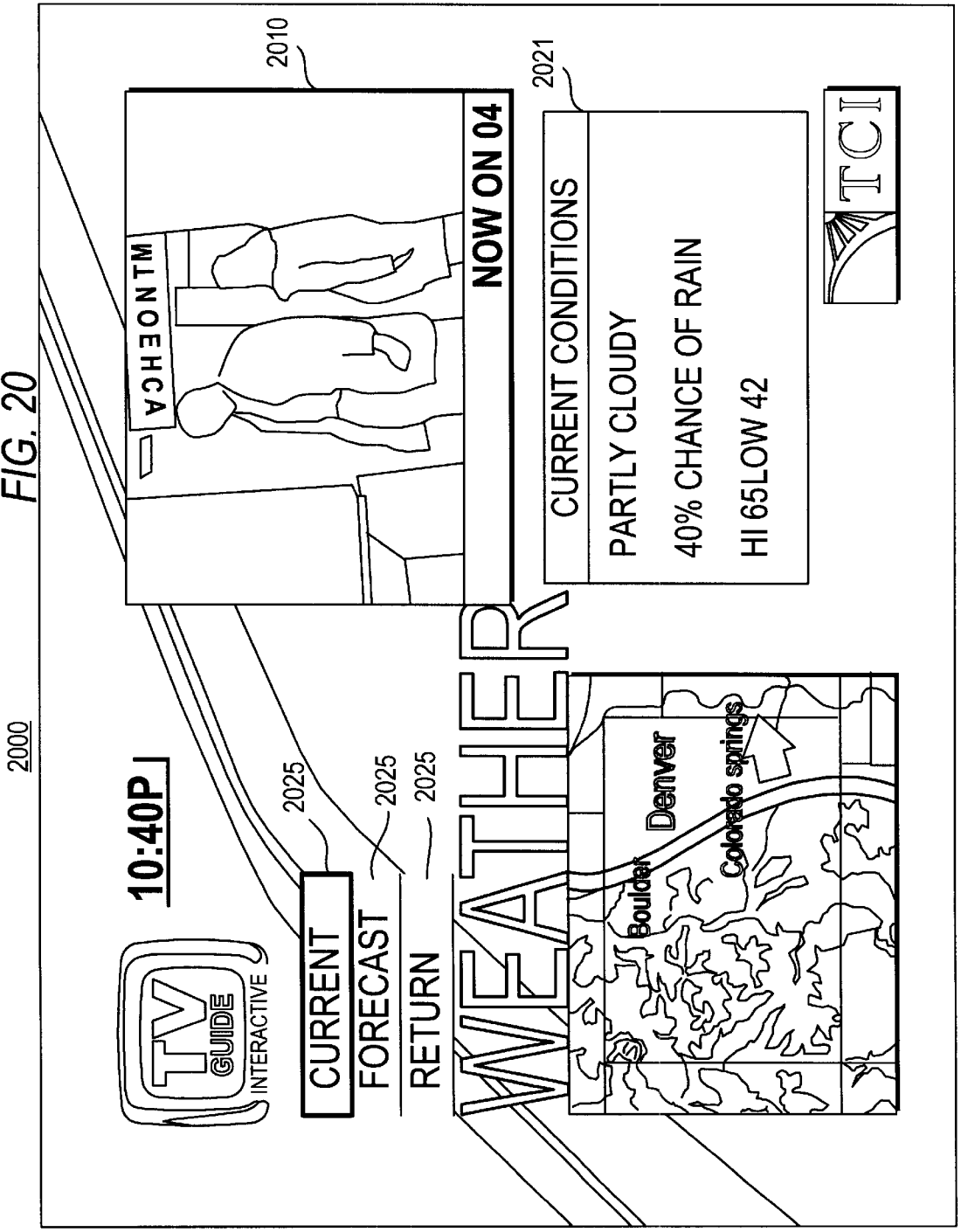

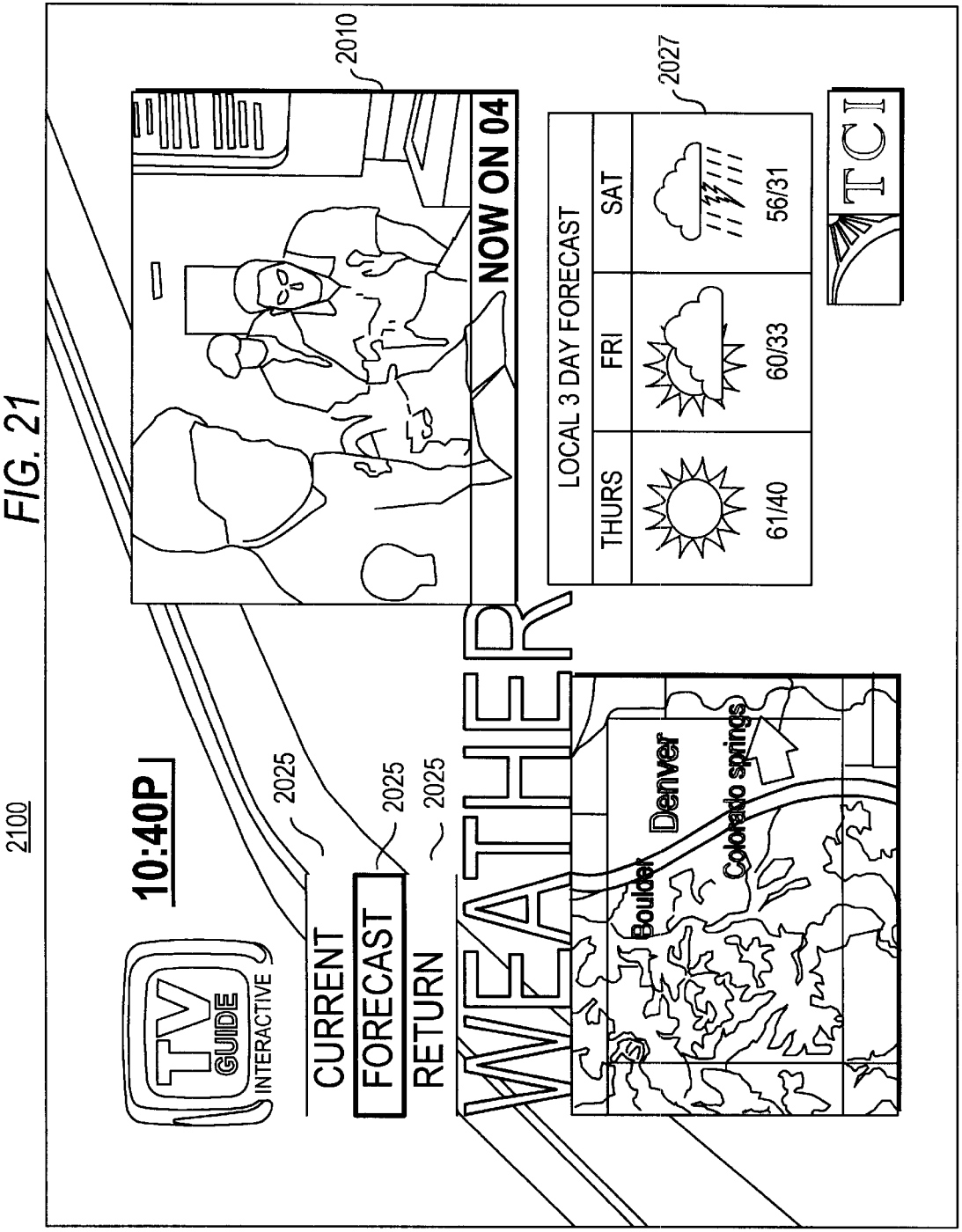

ENHANCED INTERACTIVE PROGRAM GUIDE

This application claims the benefit of U.S. provisional application No. 60/110,491, filed Dec. 1, 1998.

BACKGROUND OF THE INVENTION

This invention relates to interactive television program guide systems, and more particularly, to interactive television program guide systems with enhanced features and user interface.

Cable, satellite, and broadcast television systems provide viewers with a large number of television channels. Users have traditionally consulted printed television program schedules to determine the programs being broadcast at a particular time. More recently, interactive television program guides have been developed that allow television program information to be displayed on a user's television. Interactive television program guides, which are typically implemented on set-top boxes, allow the user to navigate through television program listings using a remote control. In a typical program guide, various groups of television program listings are displayed in predefined or user-selected categories. Program listings are typically displayed in a grid or table. Interactive television program guide systems may allow users to view other television related information, such as advertisements, news, weather, etc. Interactive television program guides may also provide users with the opportunity to select and navigate through favorite channels, set parental control of channels and programs, set programming reminders, and set up the electronic television program guide.

Interactive television systems to this point have displayed program related information in less than optimal ways. Some program guides do not allow users to continue to watch television while viewing program guide data. Other program guide systems display too much data for the user at once, overwhelming the user.

It is therefore an object of the present invention to provide an interactive televison program guide system in which users are provided with easier access to various program guide functions through an enhanced user interface.

It is a further object of the present invention to provide an interactive television program guide system in which users are provided with the opportunity to access program related information and other information in new ways.

It is a further object of the present invention to provide an enhanced screening room in which users may preview programs for ordering.

It is a further object of the present invention to provide a screening room in which a preview video window explodes from partial-screen to full-screen.

SUMMARY OF THE INVENTION

These and other objects of the present invention are accomplished in accordance with the principles of the present invention by providing an interactive television program guide system in which television program listings and other television related information are displayed in a way that is visually pleasing to users and that is user friendly.

In addition, the electronic television program guide of the present invention provides functions that have not been provided before by other interactive television program guide systems.

The interactive guide may, for example, provide users with an opportunity to preview pay-per-view programs before ordering. The guide may, for example, display a pay-per-view program preview in a video window. The video window may occupy a portion of the screen. If desired, a video window of the video from the currently tuned to channel may be displayed simultaneously in a second video window. In response to the user ordering a previewed pay-per-view program, the interactive guide may explode the pay-per-view program preview window into a full-screen video.

In one suitable approach, the screening room may allow the user to preview the first few minutes (e.g., five minutes) of a program. The program may be a program currently aired on a channel to which the guide has tuned (e.g., using a second tuner), or a program being provided using a suitable video-on-demand scheme. The user may indicate a desire to purchase the program any time within the preview. After the user indicates a desire to purchase the program, the video window may explode to a full screen and the user may continue to watch the program.

In another suitable approach, the video window may play a trailer for a program. The trailer may be currently aired (e.g., on a barker channel or on the channel of the promoted program just before the program airs), or may be provided using a suitable video-on-demand approach. In response to the user indicating a desire to purchase the promoted program, the guide may, for example, explode the video window to a full screen, finish playing the trailer, and then display the purchased program. Alternatively, the guide may freeze the trailer, explode the video window into full-screen, and then begin playing the purchased program.

In still another suitable approach, the guide may provide an "anytime free preview" feature. The guide may display the currently aired featured program in the video window, thereby allowing the user to preview a program from its current point. After a predefined period of time (e.g., five minutes), the guide may stop the preview and display a trailer if the user has not purchased the program. If the user purchases the program, the guide may explode the video window to a full-screen size and allow the user to continue viewing the program.

In the interactive television program guide system of the present invention, a main facility (e.g., a satellite uplink facility) provides data from a data source to a number of television distribution facilities (e.g., a cable system headend, a broadcast distribution facility, a satellite television distribution facility, or any other suitable distribution facility). The data transmitted by main facility to television distribution facility includes television programming data (e.g., titles, channels, content information, rating information, or any other information associated with television programming), and other program guide data for additional services other than television program listings (e.g., weather information, associated Internet web links, computer software, etc.).

The interactive television program guide of the present invention may be provided in systems in which program guide data is distributed from a main facility to an interactive television program guide implemented on user television equipment, via a television distribution facility. Other suitable systems involve systems in which data is distributed to a program guide on user television equipment using other suitable distribution schemes, such as schemes involving data transmission over the Internet or the like. If desired, the interactive television program guide application may be implemented using a client-server architecture in which the primary processing power for the application is provided by a server located at, for example, the television distribution facility or the main facility and user television equipment acts as a client processor.

The program guide display screens generated by the program guide of the present invention may be designed to provide the user with access to various program guide features while still allowing the user to view television programming. The display screens may include any suitable combination of text, graphic, and video elements. In particular, the display screens may contain the current time, product brand graphics, cable provider graphics, sponsor graphics, selectable advertisements, video windows that display the television programming on the current channel, or any suitable combination thereof.

The display screens are also preferably designed to display graphics, videos, and other information in a way that is visually pleasing to the user. The display screens may have backgrounds of any suitable graphic or combination of graphics. The various display screen elements (e.g., graphics, text, videos) may be displayed with shadows giving the appearance that the elements are in three dimensions. Any other suitable special effect may be used.

Further features of the invention, its nature and various advantages will be more apparent from the accompanying drawings and the following detailed description of the preferred embodiments.

BRIEF DESCRIPTION OF THE DRAWINGS

FIGS. 14 and 15 show illustrative TV Guide Store screens in accordance with the principles of the present invention.

FIGS. 20 and 21 show illustrative display screens for providing users with access to weather information in accordance with the principles of the present invention.

DETAILED DESCRIPTION OF THE PREFERRED EMBODIMENTS

Figure 1:
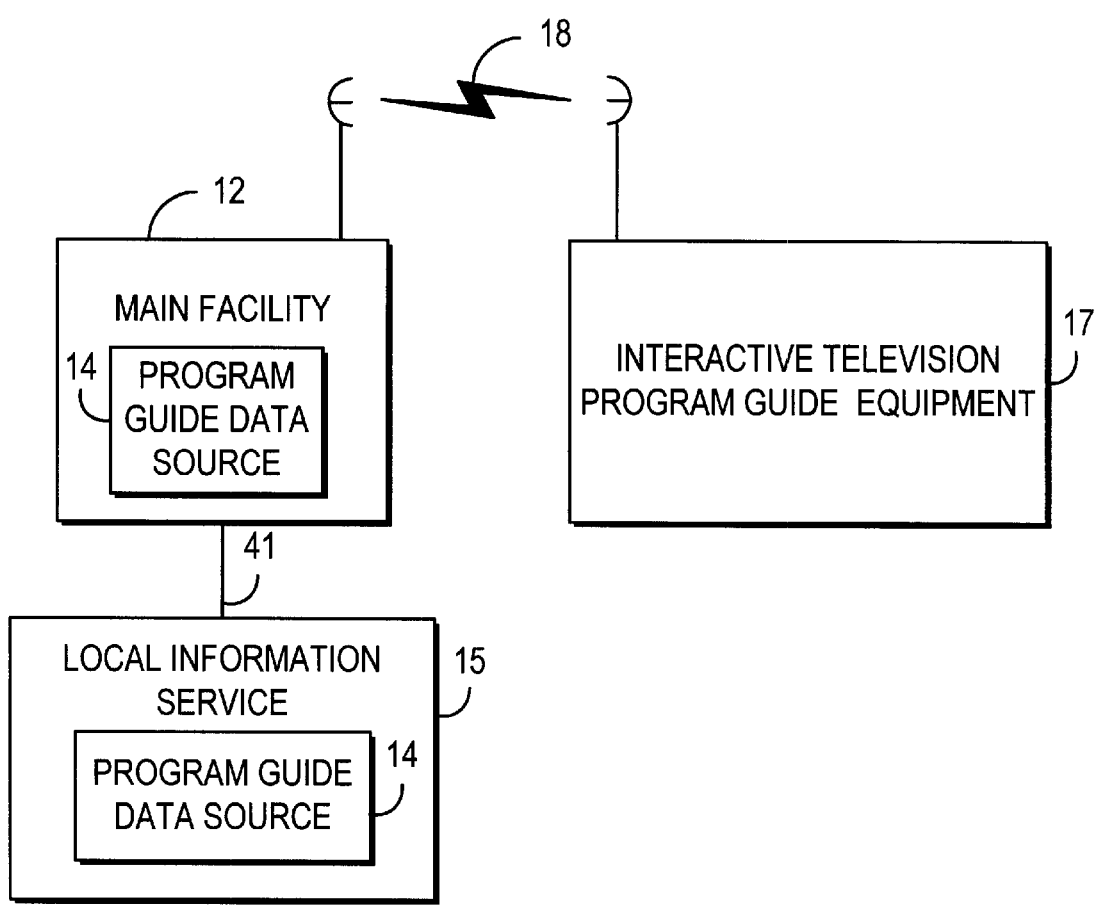
FIG. 1 is a schematic block diagram of an illustrative system in accordance with the present invention.

An illustrative system 10 in accordance with the principles of the present invention is shown in FIG. 1. Main facility 12 provides program guide data from program guide data source 14 to interactive television program guide equipment 17 via communications link 18. There may be multiple program guide data sources but only one has been shown to avoid overcomplicating the drawing. If desired, program guide data sources may be located at facilities separate from main facility 12, such as at local information service 15, and have their data provided to main facility 12 for localization and distribution. Data sources 14 may be any suitable computer or computer based system for obtaining data (e.g., manually from an operator, electronically via a computer network or other connection, or via storage media) and putting the data into electronic form for distribution by main facility 12. Link 18 may be a satellite link, a telephone network link, a cable or fiber optic link, a microwave link, an Internet link, a combination of such links, or any other suitable communications link. Video signals may also be transmitted over link 18 if desired.

Local information service 15 may be any suitable facility for obtaining data particular to a localized region and providing the data to main facility 12 over communications link 41. Local information service 15 may be, for example, a local weather station that measures weather data, a local newspaper that obtains local high school and college sporting information, or any other suitable provider of information. Local information service 15 may be a local business with a computer for providing main facility 12 with, for example, local ski reports, fishing conditions, menus, etc., or any other suitable provider of information. Link 41 may be a satellite link, a telephone network link, a cable or fiber optic link, a microwave link, an Internet link, a combination of such links, or any other suitable communications link.

The program guide data transmitted by main facility 12 to interactive television program guide equipment 17 may include television programming data (e.g., program identifiers, times, channels, titles, and descriptions) and other data for services other than television program listings (e.g., help text, pay-per-view information, weather information, sports information, music channel information, associated Internet web links, associated software, etc.). There are preferably numerous pieces or installations of interactive television program guide equipment 17, although only one is shown in FIG. 1 to avoid over-complicating the drawing.

Program guide data may be transmitted by main facility 12 to interactive television program guide equipment 17 using any suitable approach. Data files may, for example, be encapsulated as objects and transmitted using a suitable Internet based addressing scheme and protocol stack (e.g., a stack which uses the user datagram protocol (UDP) and Internet protocol (IP)). Systems in which program guide data is transmitted from a main facility to television distribution facilities are described, for example, in Gollahon et al. U.S. patent application Ser. No. 09/332,624, filed Jun. 11, 1999, which is hereby incorporated by reference herein in its entirety.

An interactive television program guide is implemented on interactive television program guide equipment 17. Five illustrative arrangements for interactive television program guide equipment 17 are shown in FIGS. 2a–2e. As shown, interactive television program guide equipment 17 may include distribution equipment 21 located at program guide distribution facility 16, and user television equipment 22.

Figure 2A:
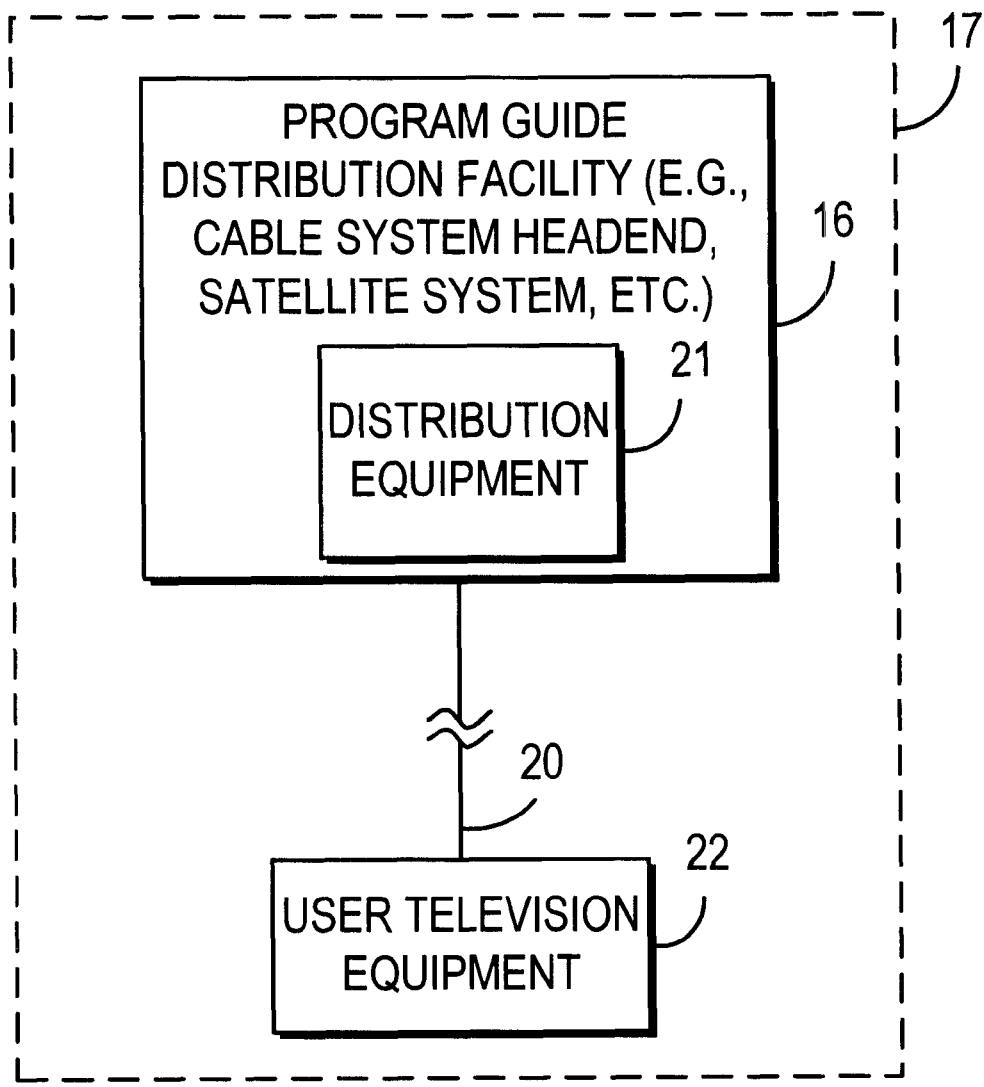
FIGS. 2a–2e show illustrative arrangements for the interactive television program guide equipment of FIG. 1 in accordance with the principles of the present invention.
Figure 2B:
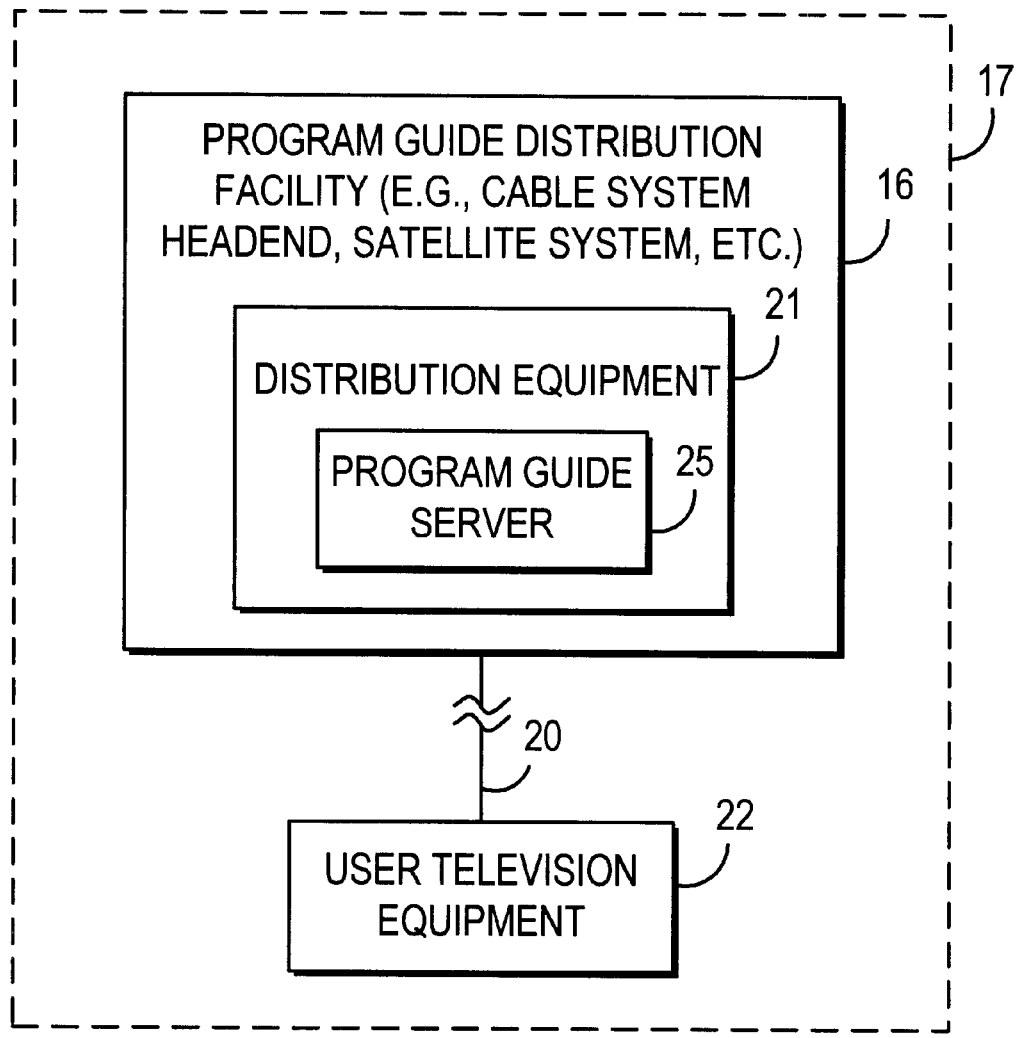
Figure 2C:
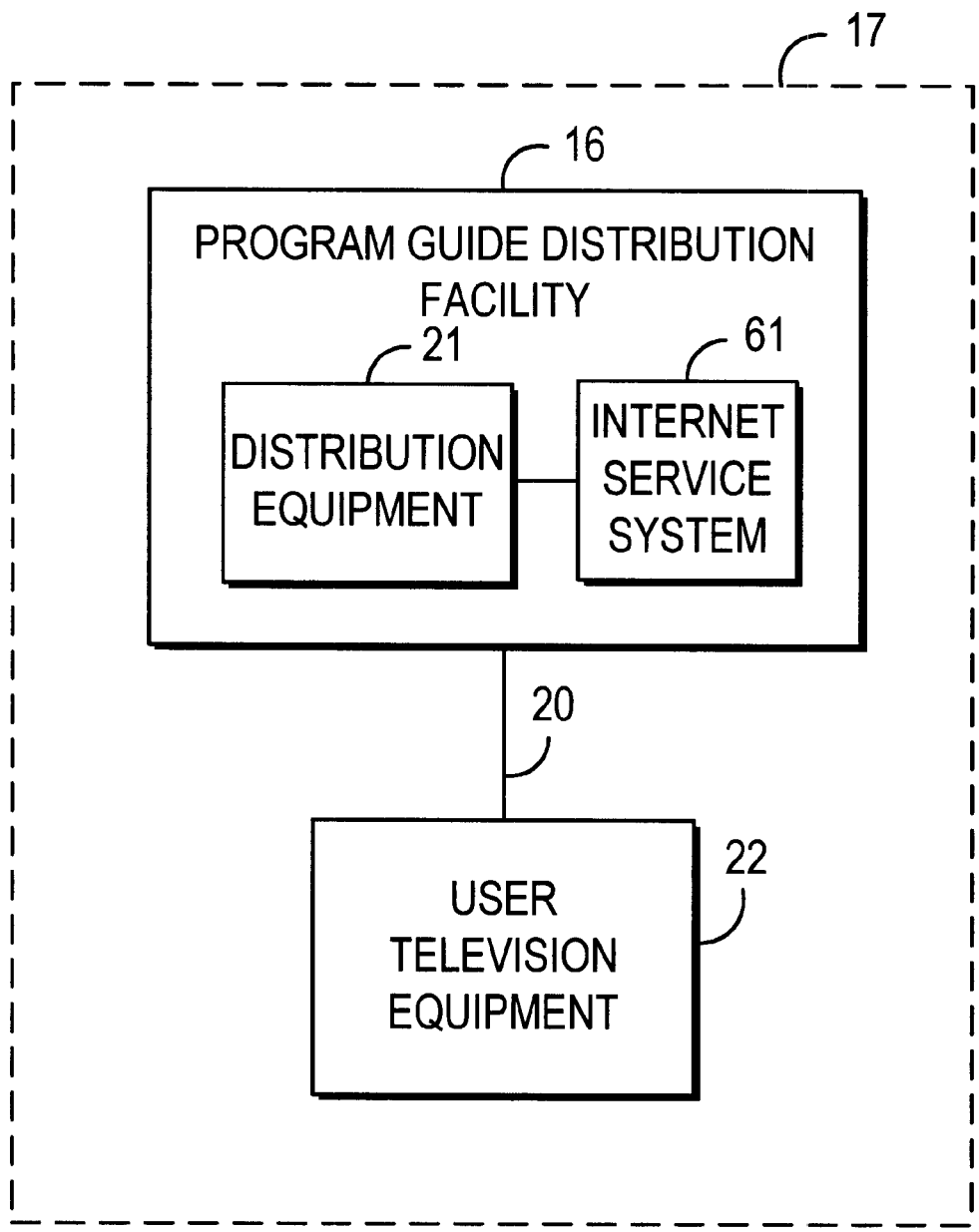
Figure 2D:
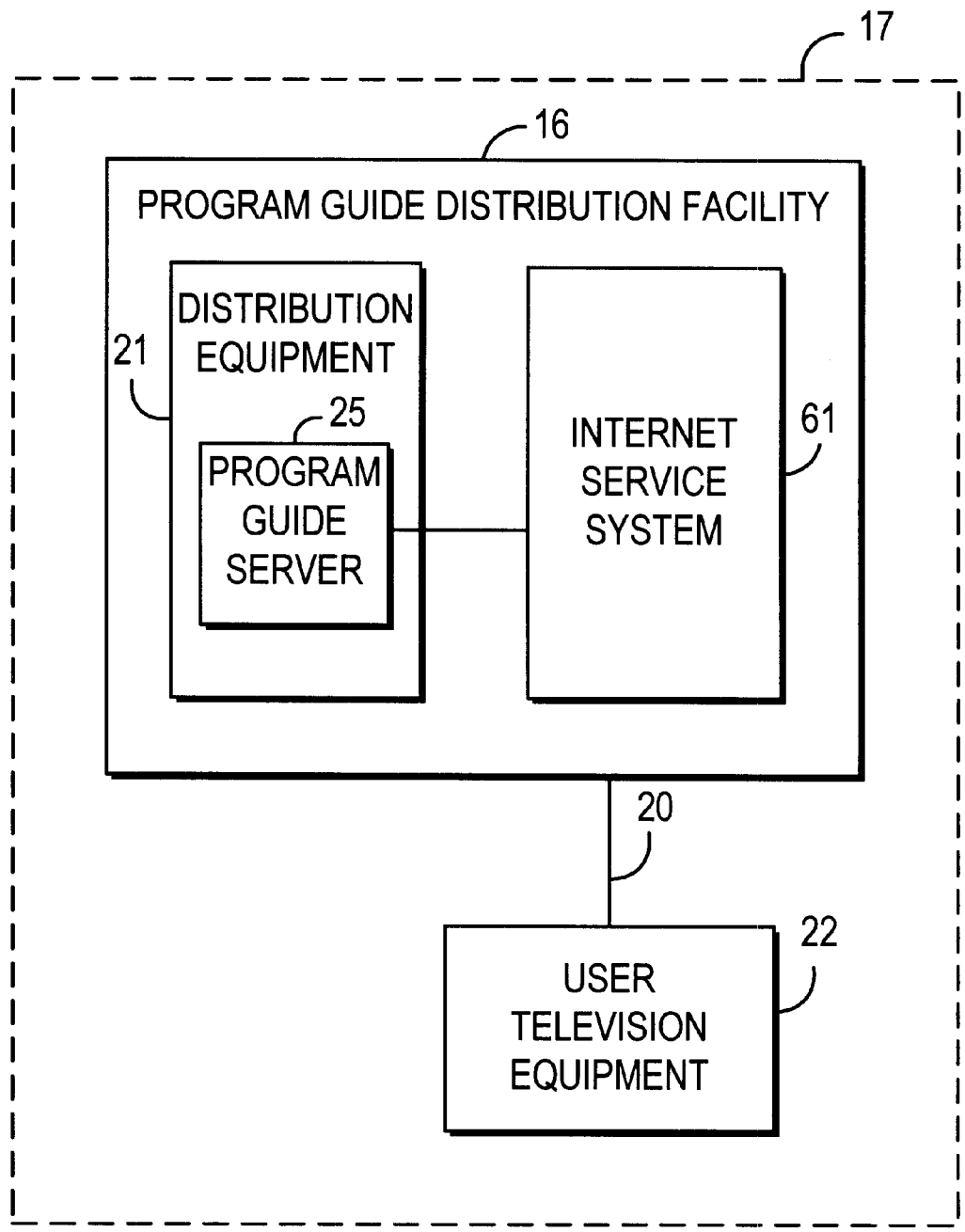

The interactive television program guide may run totally on user television equipment 22 as shown in FIGS. 2a and 2c, or may run partially on user television equipment 22 and partially on interactive television program guide equipment 17 using a suitable client-server or distributed processing approach as shown in FIGS. 2b and 2d. Program guide distribution acility 16 may be any suitable distribution facility (e.g., a cable system headend, a broadcast distribution facility, a satellite television distribution facility, or any other suitable type of television distribution facility). Program guide distribution facility 16 may have distribution equipment 21.

Figure 2E:
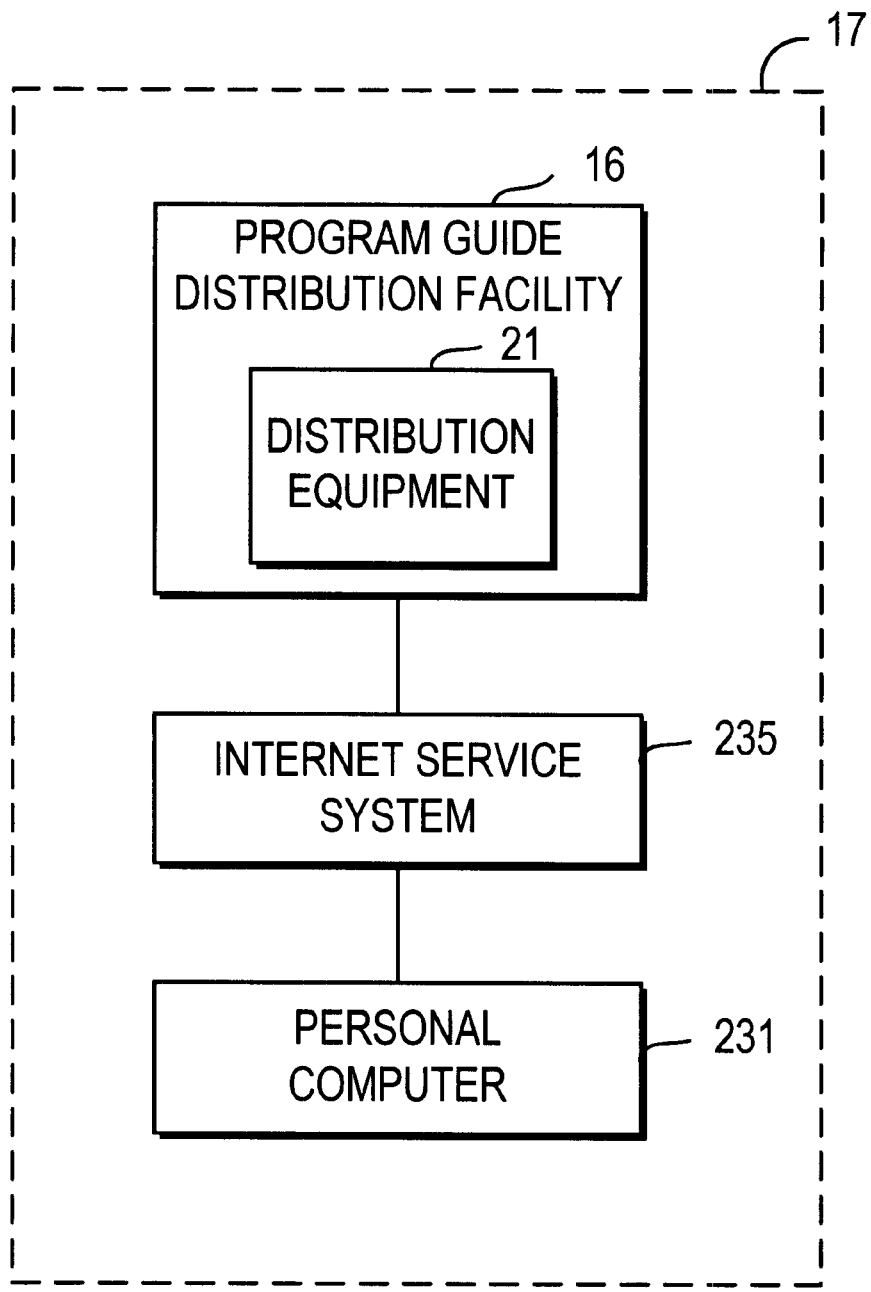

Distribution equipment 21 of FIGS. 2a, 2b, 2c, and 2d may be any equipment suitable for providing program guide data to user television equipment 22 over communications path 20. In FIG. 2e, distribution equipment 21 may provide program guide data to Internet service system 235 via, for example, a suitable computer network or Internet link. Distribution equipment 21 may include, for example, suitable transmission hardware for distributing program guide data on a television channel sideband, in the vertical blanking interval of a television channel, using an inband digital signal, using an out-of-band digital signal, or by any other suitable data transmission technique. Analog or digital video signals (e.g., television programs) may also be distributed by distribution equipment 21 to user television equipment 22 over communications paths 20 on multiple television channels.

Communications paths 20 may be any communications paths suitable for distributing program guide data. Communications paths 20 may include, for example, a satellite link, a telephone network link, a cable or fiber optic link, a microwave link, an Internet link, a data-over-cable service interface specification (DOCSIS) link, digital subscriber line (DSL) link, a combination of such links, or any other suitable communications link. Communications paths 20 preferably have sufficient bandwidth to allow program guide distribution facility 16 to distribute television programming to user television equipment 22. There are typically multiple pieces of user television equipment 22 and multiple associated communications paths 20, although only one piece of user television equipment 22 and communications path 20 are shown in FIGS. 2a–2d to avoid over complicating the drawings. If desired, television programming may be provided over separate communications paths (not shown).

FIG. 2b shows an illustrative arrangement for interactive television program guide equipment 17 in a client-server based or distributed interactive program guide system. As shown in FIG. 2b, distribution equipment 21 may include program guide server 25. Program guide server 25 may be any suitable software, hardware, or combination thereof for providing a client-server based program guide. Program guide server 25 may, for example, run a suitable database engine (e.g., SQL Server by Microsoft) and provide program guide data in response to queries generated by a program guide client implemented on user television equipment 22. If desired, program guide server 25 may be located at main facility 12 (not shown).

The program guide may retrieve program guide data from program guide server 25 using any suitable client-server based approach. The program guide may, for example, pass SQL requests as messages to program guide server 25. In another suitable approach, the program guide may invoke remote procedures that reside on program guide server 25 using one or more remote procedure calls. Program guide server 25 may execute SQL statements for such invoked remote procedures. In still another suitable approach, client objects executed by the program guide may communicate with server objects executed by program guide server 25 using, for example, an object request broker (ORB). This may involve using, for example, Microsoft's Distributed Component Object Model (DCOM) approach.

The program guide may communicate with program guide server 25 or Internet service system 61 over communications path 20 using any suitable network and transport layer protocols, if desired. A protocol stack may be used which includes, for example, Sequenced Packet Exchange/Internetwork Packet Exchange (SPX/IPX) layers, Transmission Control Protocol/Internet Protocol (TCP/IP) layers, AppleTalk Transaction Protocol/Datagram Delivery Protocol (ATP/DDP) layers, or any other suitable network and transport layer protocols. If desired DOCSIS may also be used.

FIGS. 2c and 2d show illustrative Internet based interactive television program guide systems. Program guide distribution facility 16 may, for example, include Internet service system 61. Internet service system 61 may use any suitable combination of hardware and software capable of providing program guide data to the guide using an Internet based approach (e.g., the HyperText Transfer Protocol (HTTP)). If desired, Internet service system 61 may be located at a facility that is separate from program guide distribution facility 16.

If the program guide is implemented on user television equipment 22 of interactive television program guide equipment 17 as shown in FIG. 2c, Internet service system 61 (or other suitable equipment at program guide distribution facility 16 that is connected to Internet service system 61) may provide program guide data to user television equipment 22 via the Internet, or via program guide distribution equipment 21 using any suitable Internet-based approach (e.g., using the HyperText Transfer Protocol (HTTP) or File Transfer Protocol (FTP) over a Transmission Control Protocol/Internet Protocol (TCP/IP) type link).

If the program guide implemented on interactive television program guide equipment 17 is a client-server guide as shown in FIG. 2d, program guide server may obtain program guide data from Internet service system 61. The program guide may also, however, obtain program guide data from Internet service system 61 via an Internet connection.

In still another embodiment, distribution equipment 21 may include suitable hardware (not shown) on which a first portion or version of the interactive television program guide is implemented. A second portion or version of the program guide may be implemented on user television equipment 22. The two versions or portions of the interactive program guide may communicate using any suitable peer-to-peer communications scheme (e.g., messaging, remote procedure calls, etc.) and perform interactive program guide functions distributively between television distribution facility 16 and user television equipment 22.

Another suitable arrangement in which an on-line program guide is implemented on interactive program guide television equipment 17 is shown in FIG. 2e. On-line program guide systems are described, for example, in Boyer et al. U.S. patent application Ser. No. 08/938,028, filed Sep. 18, 1997, which is hereby incorporated by reference herein in its entirety. The user may have personal computer (PC) 231 on which a program guide client or web browser is implemented. Personal computer 231 may be connected to Internet service system 235 via Internet link 233. Internet service system 233 may use any suitable combination of computer hardware and software capable of providing an on-line program guide server application or web site.

Figure 3:
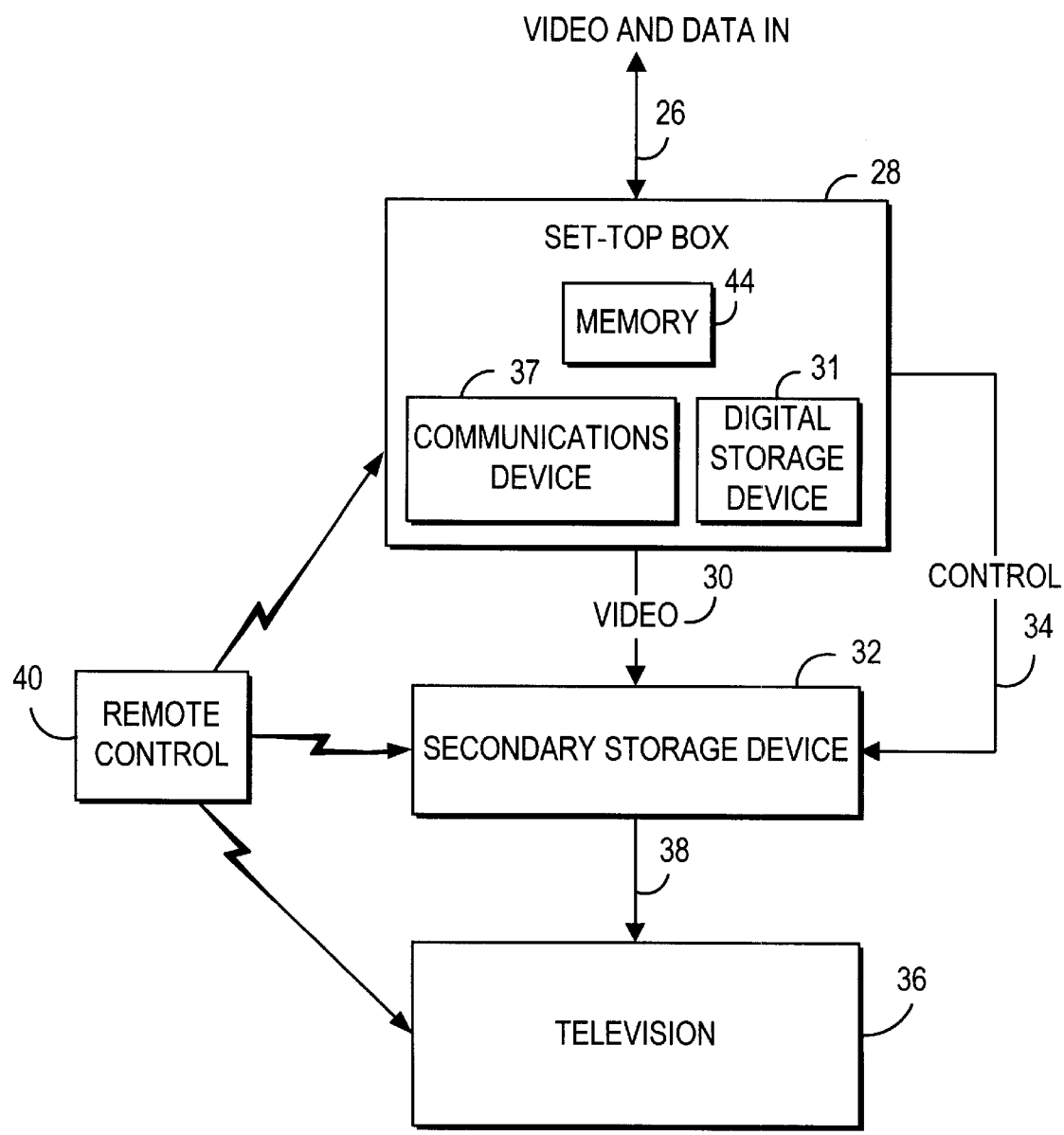
FIG. 3 is an illustrative schematic block diagram of a user television equipment of FIGS. 2a–2e in accordance with the principles of the present invention.

An illustrative arrangement for user television equipment 22 is shown in FIG. 3. User television equipment 22 of FIG. 3 receives video or a digital video stream and data from program guide distribution facility 16 (FIG. 1) at input 26. During normal television viewing, a user tunes set-top box 28 to a desired television channel. The signal for that television channel is then provided at video output 30. The signal supplied at output 30 is typically either a radio-frequency (RF) signal on a predefined channel (e.g., channel 3 or 4), or a analog demodulated video signal, but may also be a digital signal provided to television 36 on an appropriate digital bus (e.g., a bus using the Institute of Electrical and Electronics Engineers (IEEE) 1394 standard, (not shown)). The video signal at output 30 is received by optional secondary storage device 32.

The interactive television program guide or program guide client may run on set-top box 28, on television 36 (if television 36 has suitable processing circuitry and memory), on a suitable analog or digital receiver connected to television 36, or on digital storage device 31 or secondary storage device 32 if either storage device has suitable processing circuitry and memory. The interactive television program guide may also run cooperatively on a suitable combination of these devices. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

Secondary storage device 32 can be any suitable type of analog or digital program storage device or player (e.g., a videocassette recorder, a digital versatile disc (DVD) player, etc.). Program recording and other features may be controlled by set-top box 28 using control path 34. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set-top box 28, secondary storage device 32, and television 36.

If desired, a user may record programs, program guide data, or a combination thereof in digital form on optional digital storage device 31. Digital storage device 31 may be a writeable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and appropriate interface. If necessary, processing circuitry in set-top box 28 formats the received video, audio and data signals into a digital file format. Preferably, the file format is an open file format such as the Moving Picture Experts Group (MPEG) MPEG-2 standard or the Moving Joint Photographic Experts Group (MJPEG) standard. The resulting data is streamed to digital storage device 31 via an appropriate bus (e.g., a bus using the Institute Electrical and Electronics Engineers (IEEE) 1394 standard), and is stored on digital storage device 31. In another suitable approach, an MPEG-2 data stream or series of files may be received from distribution equipment 21 and stored.

Television 36 receives video signals from secondary storage device 32 via communications path 38. The video signals on communications path 38 may either be generated by secondary storage device 32 when playing back a pre-recorded storage medium (e.g., a videocassette or a recordable digital video disc), by digital storage device 31 when playing back a pre-recorded digital medium, may be passed through from set-top box 28, may be provided directly to television 36 from set-top box 28 if secondary storage device 32 is not included in user television equipment 22, or may be received directly by television 36. During normal television viewing, the video signals provided to television 36 correspond to the desired channel to which a user has tuned with set-top box 28. Video signals may also be provided to television 36 by set-top box 28 when set-top box 28 is used to play back information stored on digital storage device 31.

Set-top box 28 may have memory 44. Memory 44 may be any memory or other storage device, such as a random access memory (RAM), read only memory (ROM), flash memory, a hard disk drive, a combination of such devices, etc., that is suitable for storing program guide application instructions and program guide data for use by the program guide.

Set-top box 28 may have communications device 37 for communicating directly with program guide server 25 or Internet service system 61 over communications path 20. Communications device 37 may be a modem (e.g., any suitable analog or digital standard, cellular, or cable modem), network interface card (e.g., an Ethernet card, Token ring card, etc.), or other suitable communications device. Television 36 may also have such a suitable communications device if desired. In an alternative approach, user television equipment 22 may communicate with Internet service system 61 via distribution equipment 21 using a suitable return path.

Figure 4:
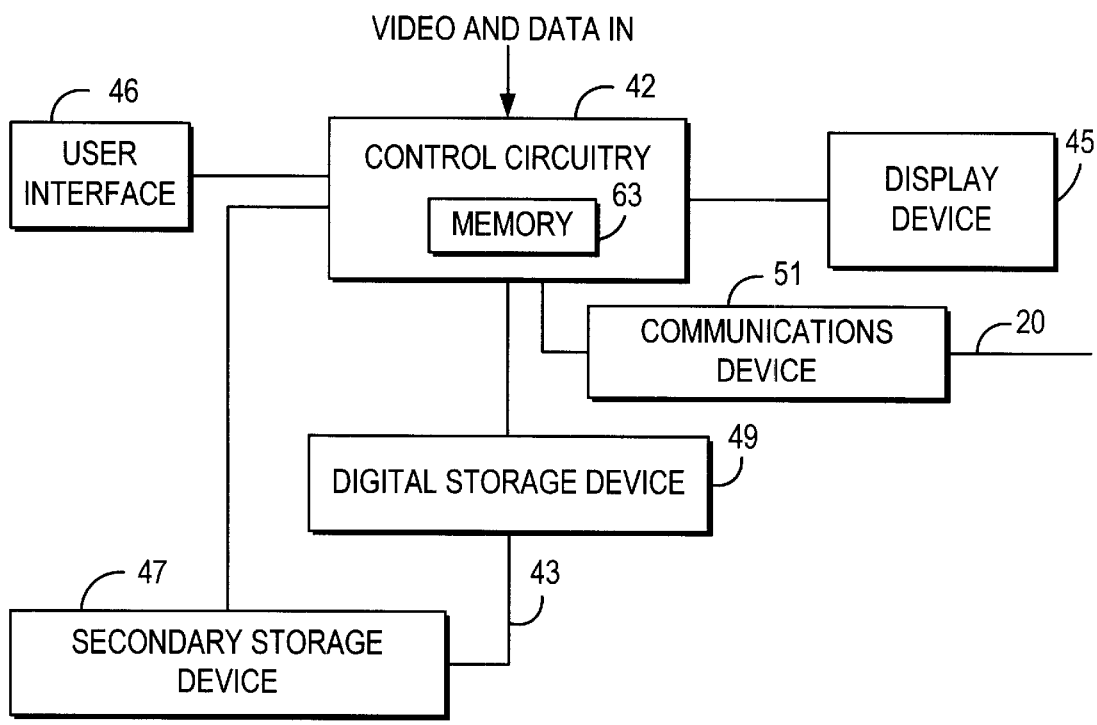
FIG. 4 is a generalized schematic block diagram of portions of the illustrative user television equipment of FIG. 3 in accordance with the principles of the present invention.

A more generalized embodiment of user television equipment 22 of FIG. 3 is shown in FIG. 4.

As shown in FIG. 4, program guide data from program guide distribution facility 16 (FIG. 1) is received by control circuitry 42 of user television equipment 22. The functions of control circuitry 42 may be provided using the set-top box arrangement of FIGS. 2a–2d. Alternatively, these functions may be integrated into an advanced television receiver, personal computer television (PC/TV), or any other suitable arrangement. If desired, a combination of such arrangements may be used.

User television equipment 22 may also have secondary storage device 47 and digital storage device 49 for recording programming. Secondary storage device 47 can be any suitable type of analog or digital program storage device (e.g., a videocassette recorder, a digital versatile disc (DVD), etc.). Program recording and other features may be controlled by control circuitry 42. Digital storage device 49 may be, for example, a writeable optical storage device (such as a DVD player capable of handling recordable DVD discs), a magnetic storage device (such as a disk drive or digital tape), or any other digital storage device.

User television equipment 22 may also have memory 63. Memory 63 may be any memory or other storage device, such as a random access memory (RAM), read only memory (ROM), flash memory, a hard disk drive, a combination of such devices, etc., that is suitable for storing program guide application instructions and program guide data for use by control circuitry 42.

User television equipment 22 of FIG. 4 may also have communications device 51 for supporting communications between the program guide and distribution equipment 21 or Internet service system 61 via communications path 20. Communications device 51 may be a modem (e.g., any suitable analog or digital standard, cellular, or cable modem), network interface card (e.g., an Ethernet card, Token ring card, etc.), or other suitable communications device.

A user controls the operation of user television equipment 22 with user interface 46. User interface 46 may be a pointing device, wireless remote control, keyboard, touchpad, voice recognition system, or any other suitable user input device. To watch television, a user instructs control circuitry 42 to display a desired television channel on display device 45. Display device 45 may be any suitable television, monitor, or other suitable display device. To access the functions of the program guide, a user instructs the program guide implemented on interactive television program guide equipment 17 to generate a main menu or other desired program guide display screen for display on display device 45.

Figure 5:
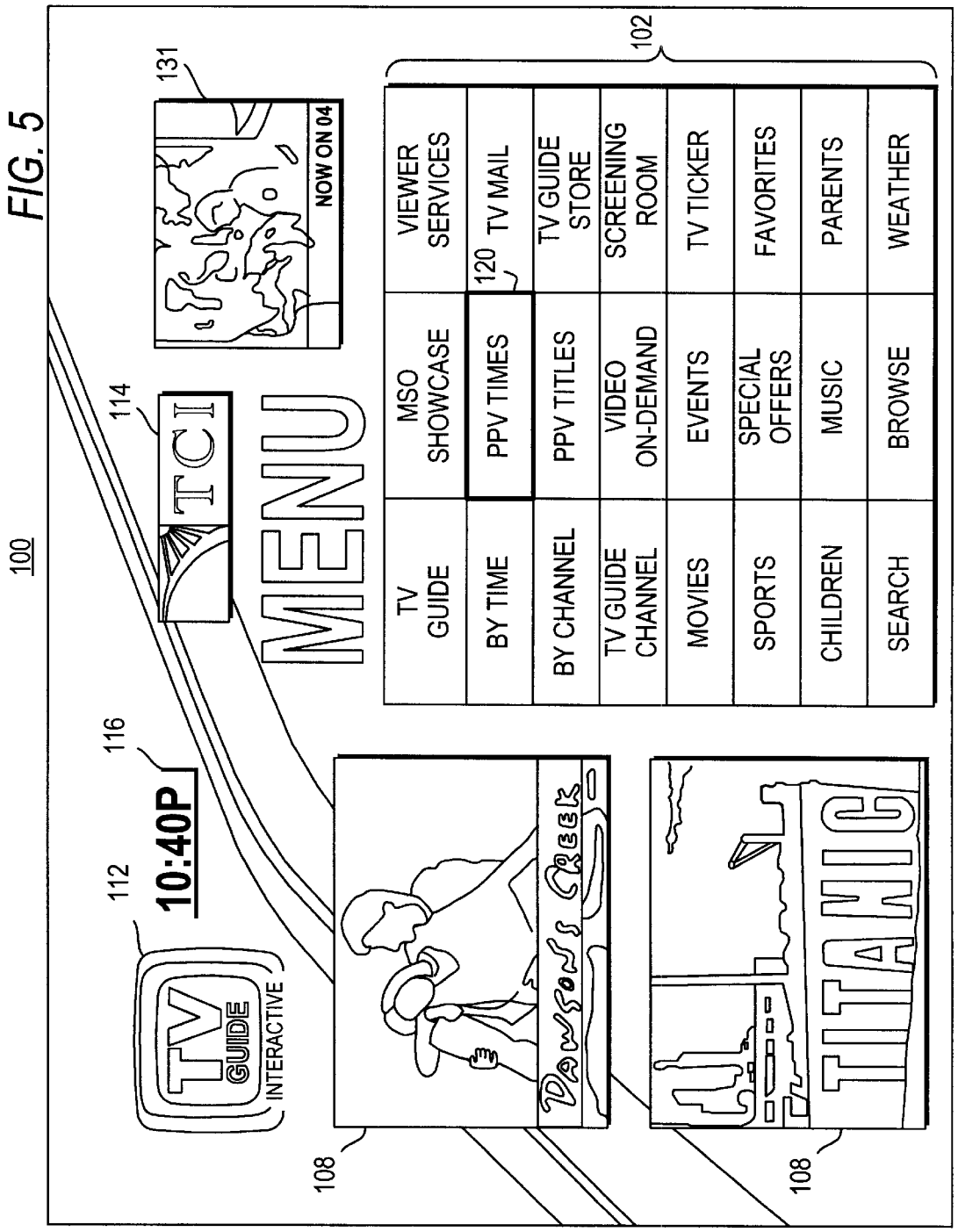
FIG. 5 shows an illustrative main menu screen in accordance with the principles of the present invention.

The user may indicate a desire to access the program guide by, for example, pressing a "guide" key on remote control 40. FIG. 5 shows an illustrative program guide main menu screen 100 that may be generated by the program guide for display in response to an indication by the user that the user wants to access the program guide. Main menu screen 100 may contain, for example, a menu 102 of selectable program guide features, one or more selectable advertisements 108, a product brand graphic 112, a cable operator or sponsor brand graphic 114, and the current time 116. The user may indicate a desire to select program guide features from the menu by, for example, moving highlight region 120 to highlight the desired feature and pressing an "OK" key on a remote control. Main menu screen 100 may also contain a video window 131 for displaying video from the channel that the user is currently watching.

Figure 6:
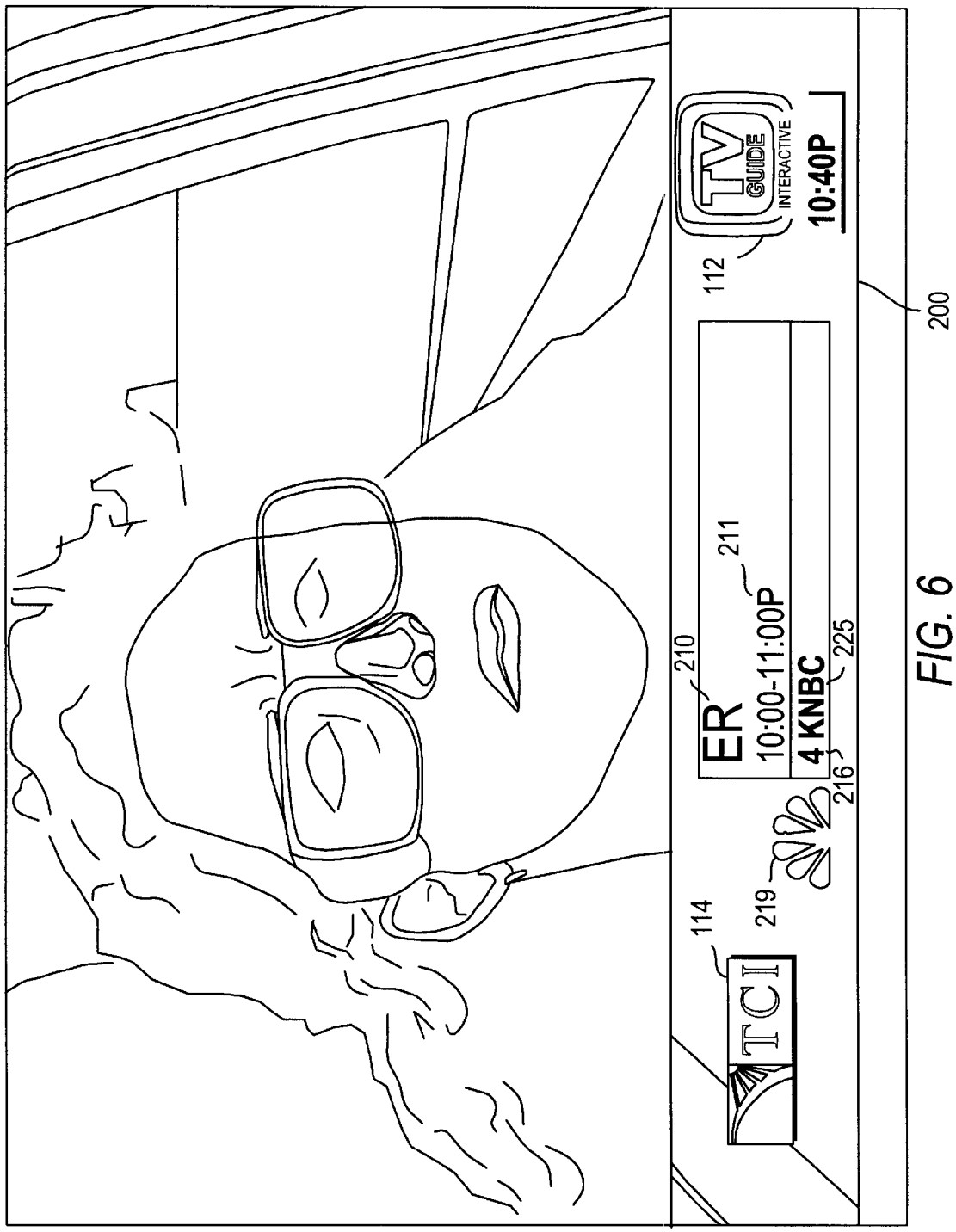
FIG. 6 shows an illustrative FLIP overlay in accordance with the principles of the present invention.

FIG. 6 illustrates a "FLIP" banner or overlay 200 that may be generated by the program guide for display in response to the user changing channels. The FLIP banner 200 may be overlaid onto the existing program to allow the user to watch programming while simultaneously having access to the features of the FLIP banner 200. Alternatively, the television programming may be resized to fit in one portion of the screen and FLIP banner 200 sized to fit in another.

The FLIP banner 200 may display information associated with the current program, such as the program title 210 and run time 211, the current channel number 216, and the current channel's call letters 225. The FLIP banner 200 may also include a number of graphics, such as a product brand graphic 112, a cable operator or sponsor brand logo or graphic 114, a channel logo graphic 219, or any other suitable graphic. The current time 116 may also be displayed.

Figure 7:
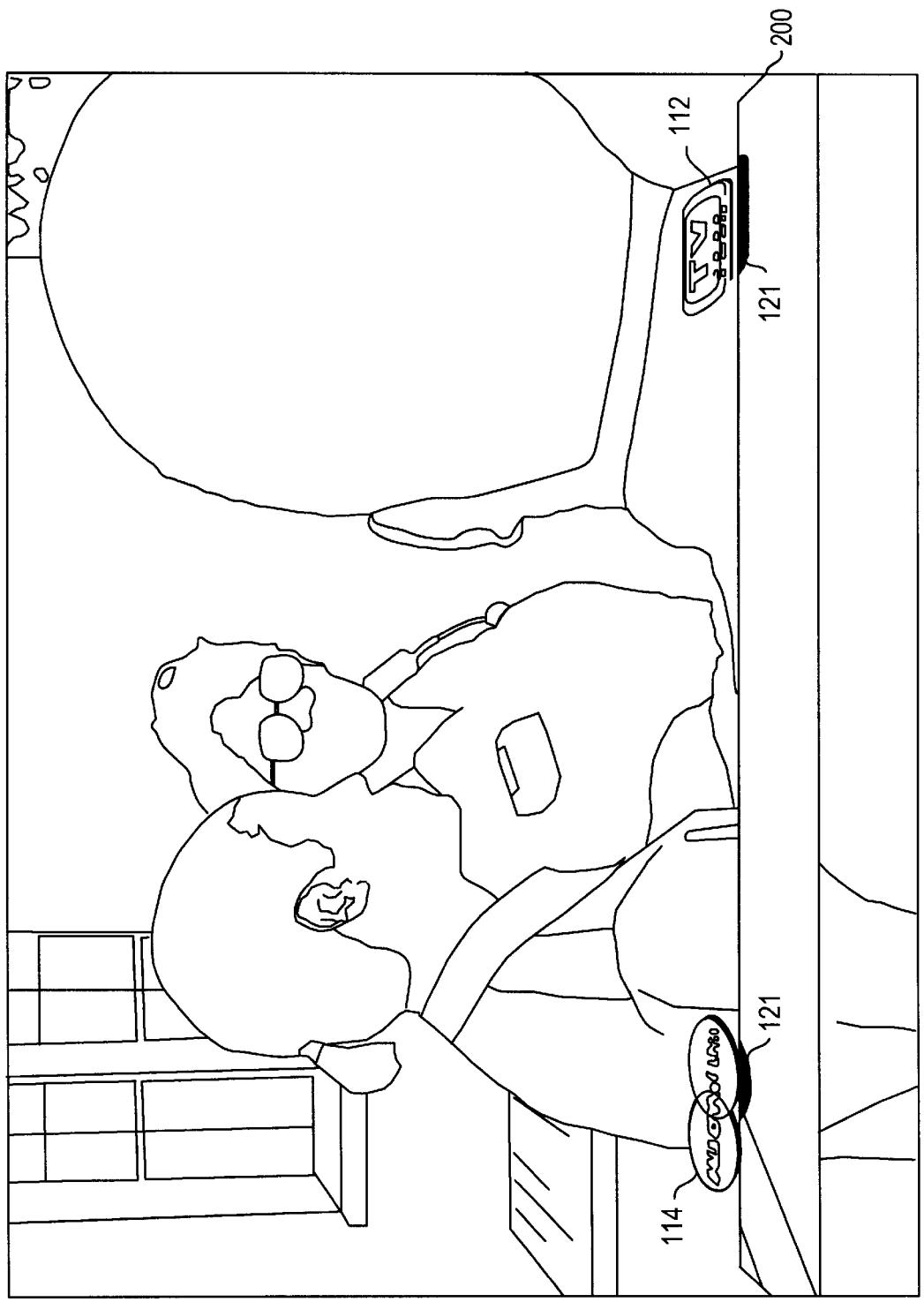
FIG. 7 shows the illustrative FLIP overlay of FIG. 6 as it is rotated about a central horizontal axis, in accordance with the principles of the present invention.

FIG. 7 shows how the FLIP banner 200 may change from one channel to another. The graphics in the banner may rotate about its central horizontal axis, and new program and channel information may be displayed. After the graphics are finished rotating, the product brand logo 112 should remain the same. Any sponsor graphics 114, however, may change according to the channel that is being displayed. As the graphics are rotated, a shadow effect 121 may be used to give a three-dimensional appearance.

Figure 8:
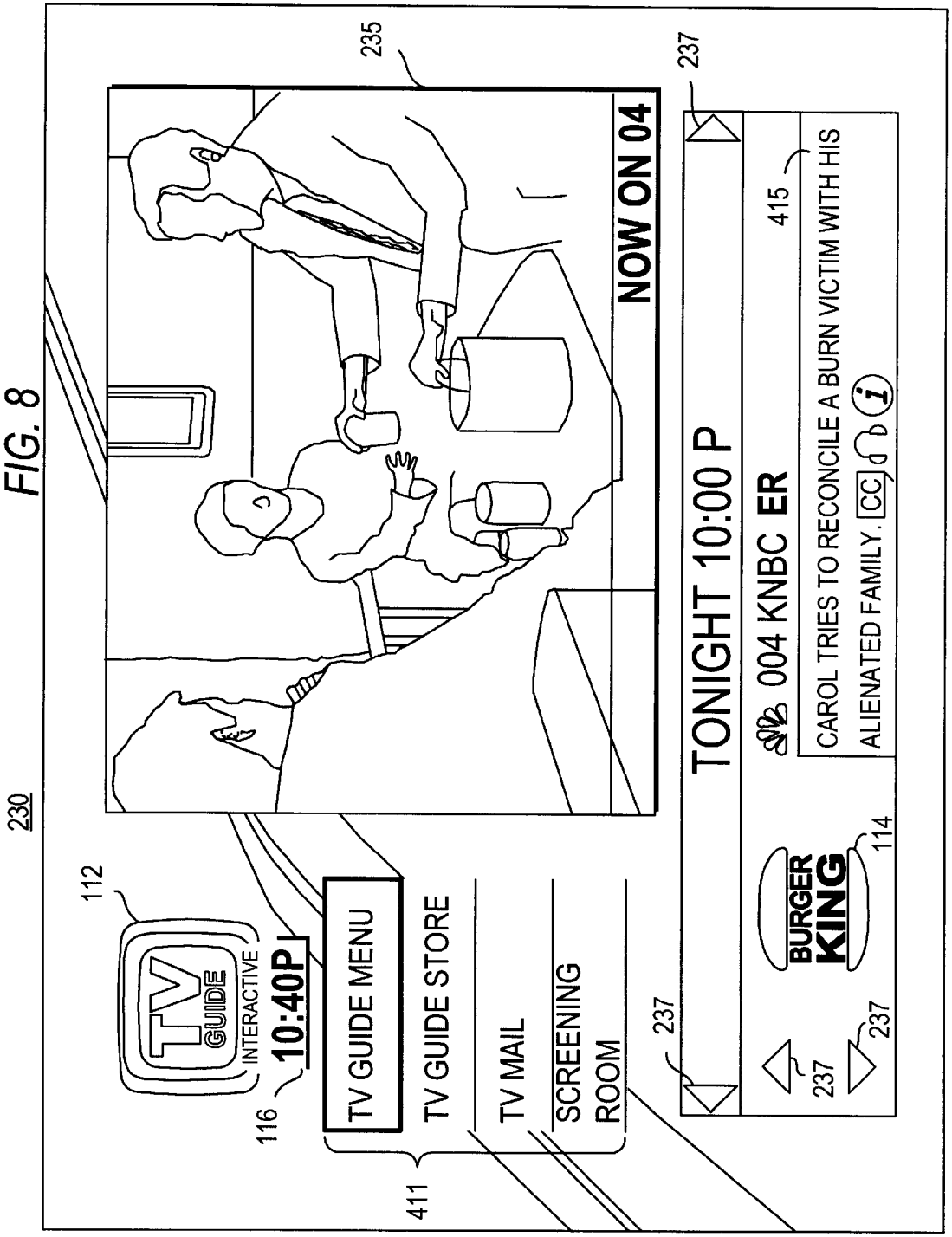
FIG. 8 shows an illustrative BROWSE screen in accordance with the principles of the present invention.

FIG. 8 shows an illustrative "BROWSE" screen 230 that may be generated by the program guide for display in response to an indication by the user that the user wishes to browse through program listings while watching television programming. A video window 235 of the programming on the current channel may be resized so that the browse information does not block any of the television programming.

The program guide may provide the user with an opportunity to change time slots and channels in order to browse through additional program listings. The user may indicate a desire to browse through additional program listings by, for example, pressing "up," "down," "left," and "right" arrows to access additional channels and time slots. The program guide may also, for example, highlight an on-screen arrow 237 to indicate to the user that a particular arrow has been pressed. The browse screen may also display a product brand graphic 112, the current time 116, a selectable list of program guide features 411, and program information 415.

Figure 9:
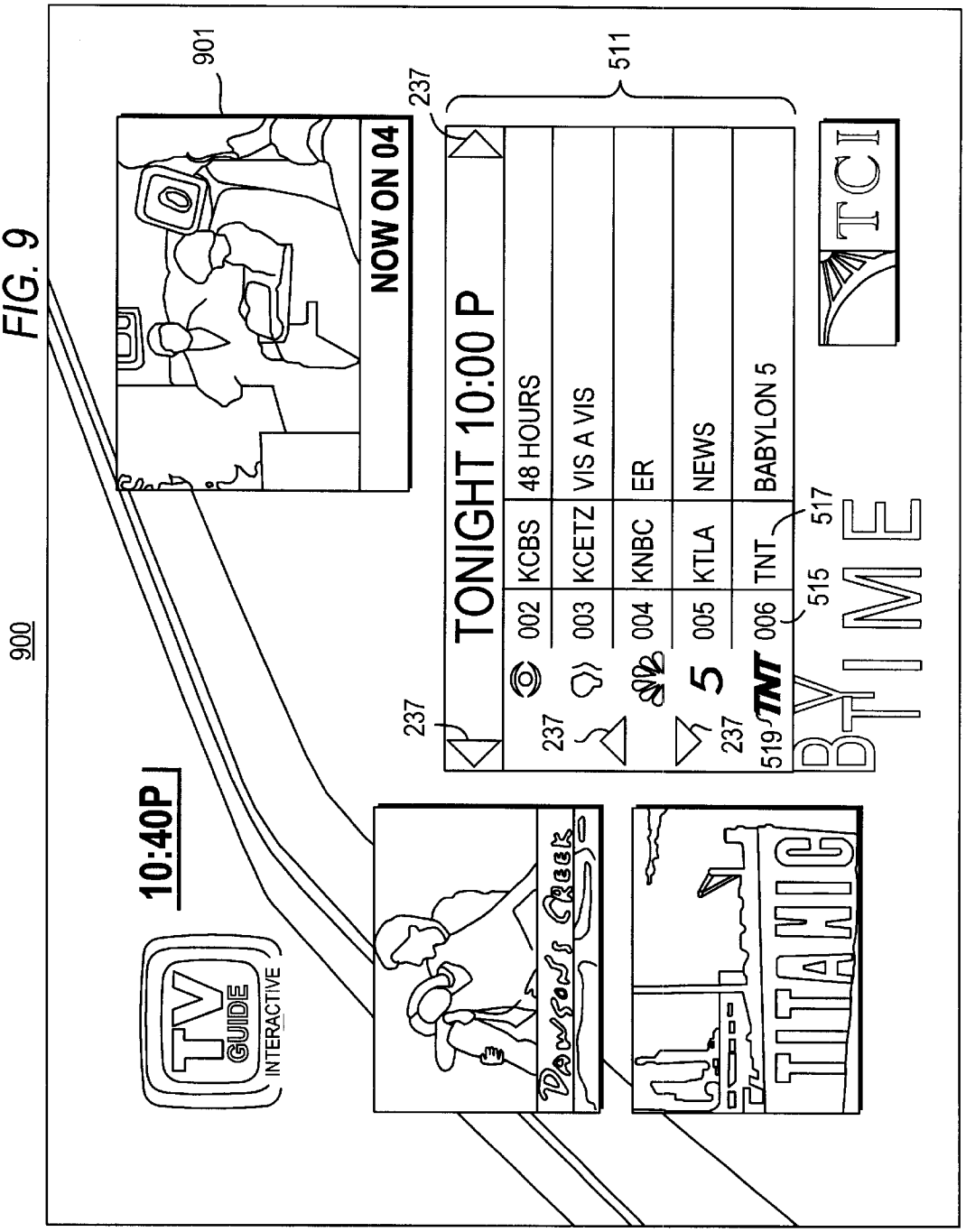
FIG. 9 shows an illustrative program guide display screen in which program listings are listed by time in accordance with the principles of the present invention.

FIG. 9 shows an illustrative program guide display screen 900 in which television program listings are listed by time. Screen 900 of FIG. 9 may be generated by the program guide for display in response to a user indicating a desire to view program listings (e.g., by pressing a suitable button on a remote control, or by selecting "BY TIME" from the main menu of FIG. 5). The listings by time screen 900 of FIG. 9 may list program listings in a scrollable list 511, and may display the channel number 515, call letters 517, and logo 519 for the program listings. The program guide may provide the user with the opportunity to change the current time slot by, for example, pressing "right" and "left" arrows on a remote control. The program guide may highlight on-screen arrows 237 to indicate to a user that an arrow key has been pressed. The program listings by time screen 900 may also have a number of graphics and selectable ads, and may also have video window 901. Video window 901 may display, for example, the currently tuned channel.

The program guide may provide the user with the opportunity to scroll through the list of program listings 511 by, for example, pressing "up" and "down" arrows on remote control 40. The program guide may highlight an on-screen arrow 237 to indicate to a user that an arrow key has been pressed. A stationary highlight region may be provided with a defined position within the list of program listings (e.g., in the center). The program guide may, for example, adjust the program listings up or down relative to the highlight region. Thus, the entire list of listings may move up or down while the highlight region remains in the center of the list of program listings.

If desired, the illustrative program guide display screen 900 of FIG. 9 may be used to display program listings in other formats. Program listings may, for example, be sorted by channel. Program listings may also be sorted by themes, such as children's programming, sports, movies, adult, or other suitable theme.

Figure 10:
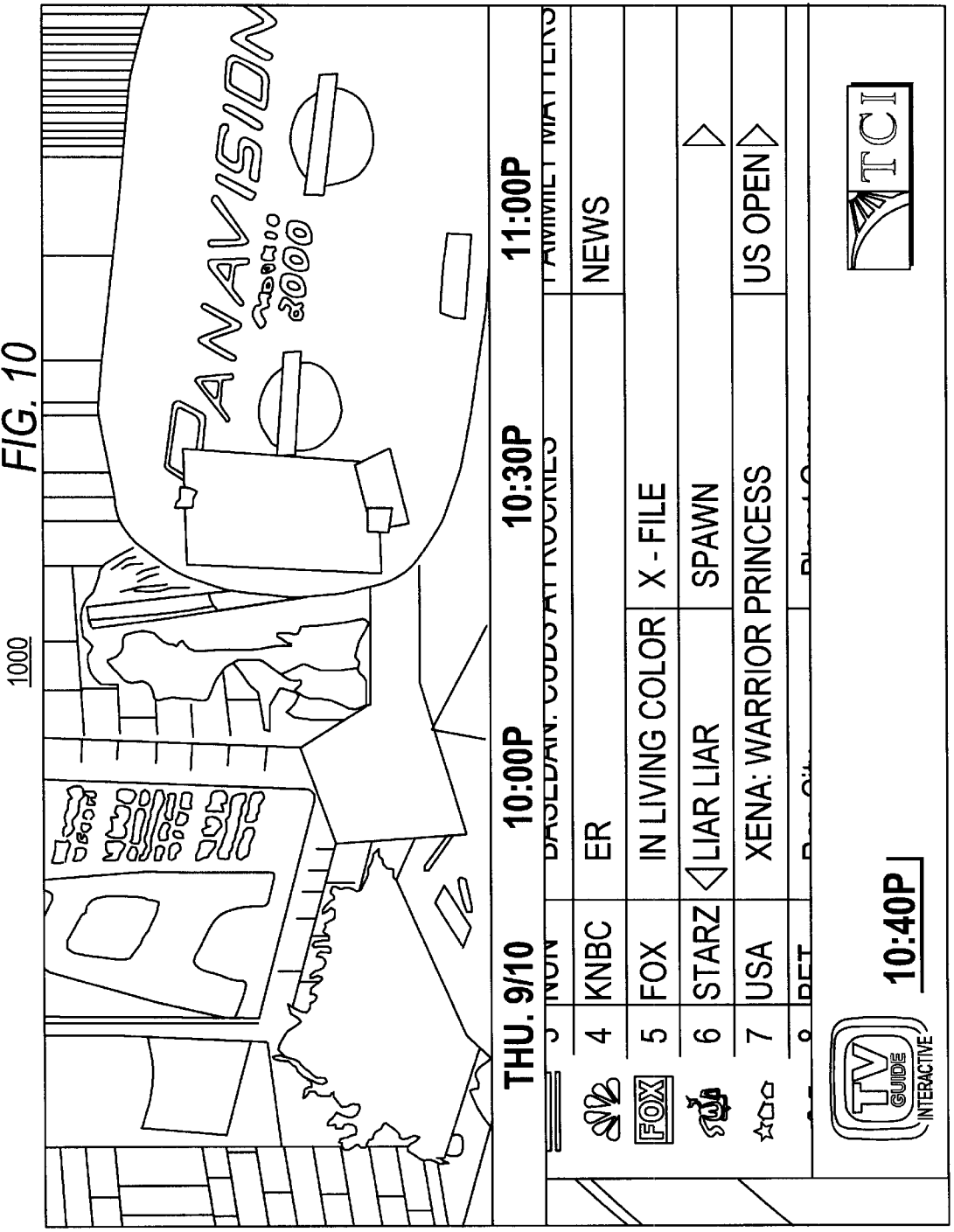
FIGS. 10 and 11 show illustrative program guide display screens in which the user is provided with an opportunity to access a passive electronic television program guide channel in accordance with the principles of the present invention.
Figure 11:
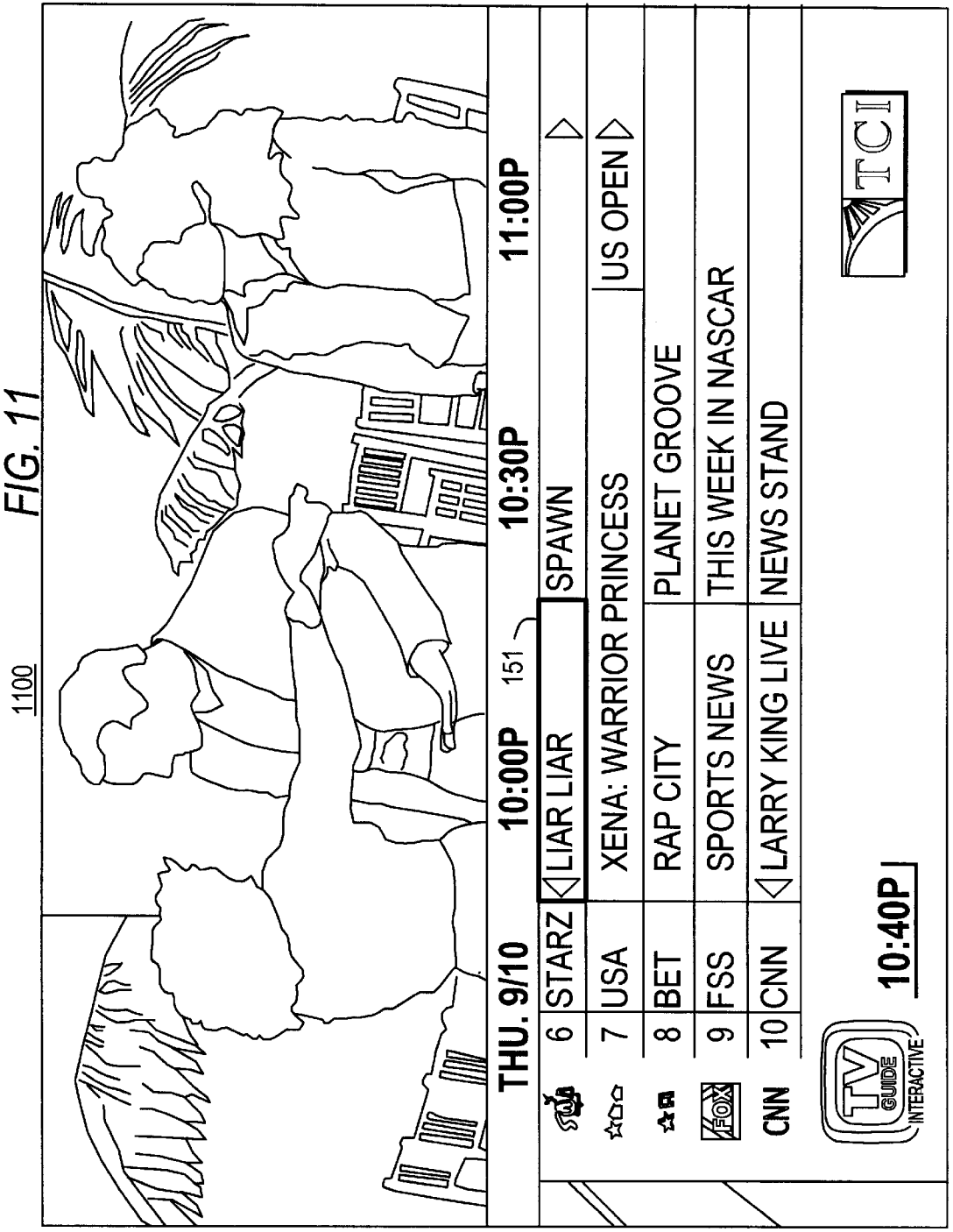

FIGS. 10 and 11 are additional illustrative program guide display screens 1000 and 1100, respectively, for providing a user with access to a passive electronic television program guide channel. As shown in FIG. 10, for example, the top portion of the display screen may contain the video that is provided as part of a passive television program guide channel that the user has tuned to. The bottom portion of the screen may, for example, display program listings that have been generated by the interactive television program guide. The video of the passive television program guide channel may be sized to fit in the top portion of the screen, or, the television program listings portion of the screen may be overlaid onto the full screen video of the passive guide channel. In practice, the program listings are displayed in a manner similar to those in the passive program guide channel to present to the user a seamless integration of the passive channel and the interactive program guide.

The program guide may display the portion of the display screen with the program listings in two modes: a passive mode and an interactive mode. When displaying listings in the passive mode, the program guide may display television program listings in pages that automatically change periodically at a user configurable rate, as shown in FIG. 10. The listings may also scroll, rather than page, and may be displayed in any suitable format, such as a grid or list.

In the interactive mode (FIG. 11), the program listings are displayed and the program guide may provide the user with the opportunity to navigate through the listings by, for example, using arrow keys on a remote control to move a highlight region 151. The program guide may display the listings in the interactive mode in response to a user command to do so. For example, the user may press a suitable key on a remote control while viewing listings in the passive mode. The program guide may return to the passive mode from the interactive mode after a period of time during which the program guide has not received commands from the user (e.g., five minutes).

Figure 12:
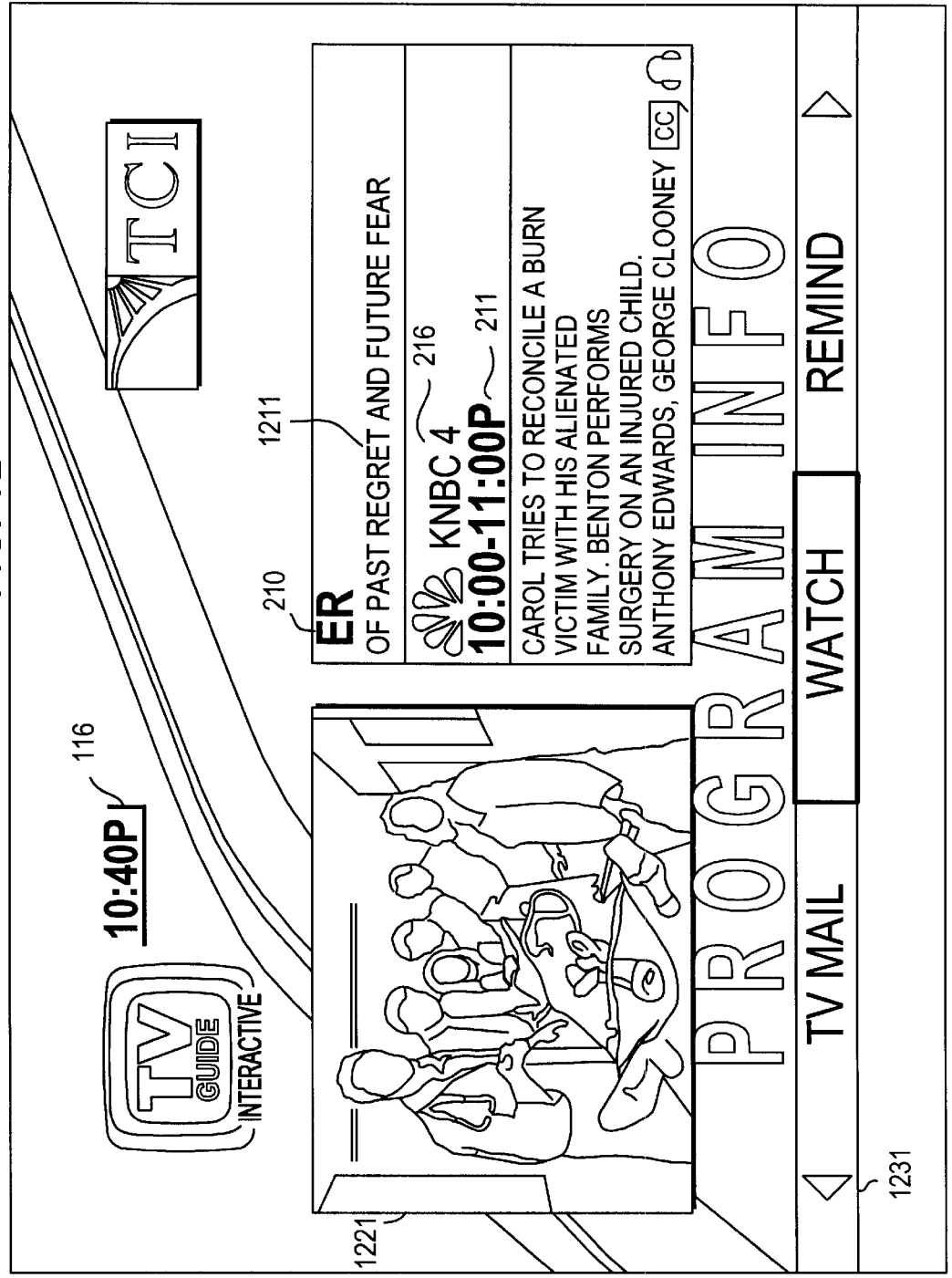
FIGS. 12 and 13 show illustrative program information screens in accordance with the principles of the present invention.

FIG. 12 shows an illustrative program information screen 1200 that may be generated by the program guide for display in response to the user indicating a desire to access program information (e.g., by selecting a program listing and pressing an "info" key on a remote control) for a program associated with a program listing. The program information screen may display, for example, the title 210 and episode name 1211 of the program, the channel 216, run-time 211, a description of the program 1215, or any other suitable information concerning the program. The program information screen may also display a still frame graphic 1221 from the program, other suitable graphics, and the current time. If the program is currently airing, the guide may display a video window containing the program, instead of still frame graphic 1221.

Program information screen 1200 may also include, for example, a video window of the current channel, additional graphics, advertisements, or any other suitable screen element. Program information screen 1200 may also include a video clip of the featured program. A video window containing the video clip may, for example, replace graphic 1221. Interactive television program guide systems in which program video clips are displayed along with information about previewed programs are described, for example, in Marshall et al. U.S. Pat. No. 5,523,796, which is hereby incorporated by reference herein in its entirety.

The program guide may also provide the user with the opportunity to select one or more program guide features from a list 1231 of selectable on-screen program guide features that are related to the program associated with the selected program listing. The list 1231 may include, for example, TV Mail, Watch, and Remind features. The TV Mail feature may allow a user to send television mail that may be related to the program associated with the selected program listing. The Watch feature may allow a user to watch the program associated with the selected program listing. The Remind feature may provide the user with an opportunity to set programming reminders for the program associated with the selected program listing. Other features may include parentally controlling the program associated with the selected program listing, seeing other air times of the program associated with the selected program listing, or ordering pay-per-views. Interactive television program guide systems that provide users with access to interactive guide functions from program information screens are described, for example, in Rudnick et al. U.S. patent application Ser. No. 09/356,268, filed Jul. 16, 1999, which is hereby incorporated by reference herein in its entirety.

Figure 13:
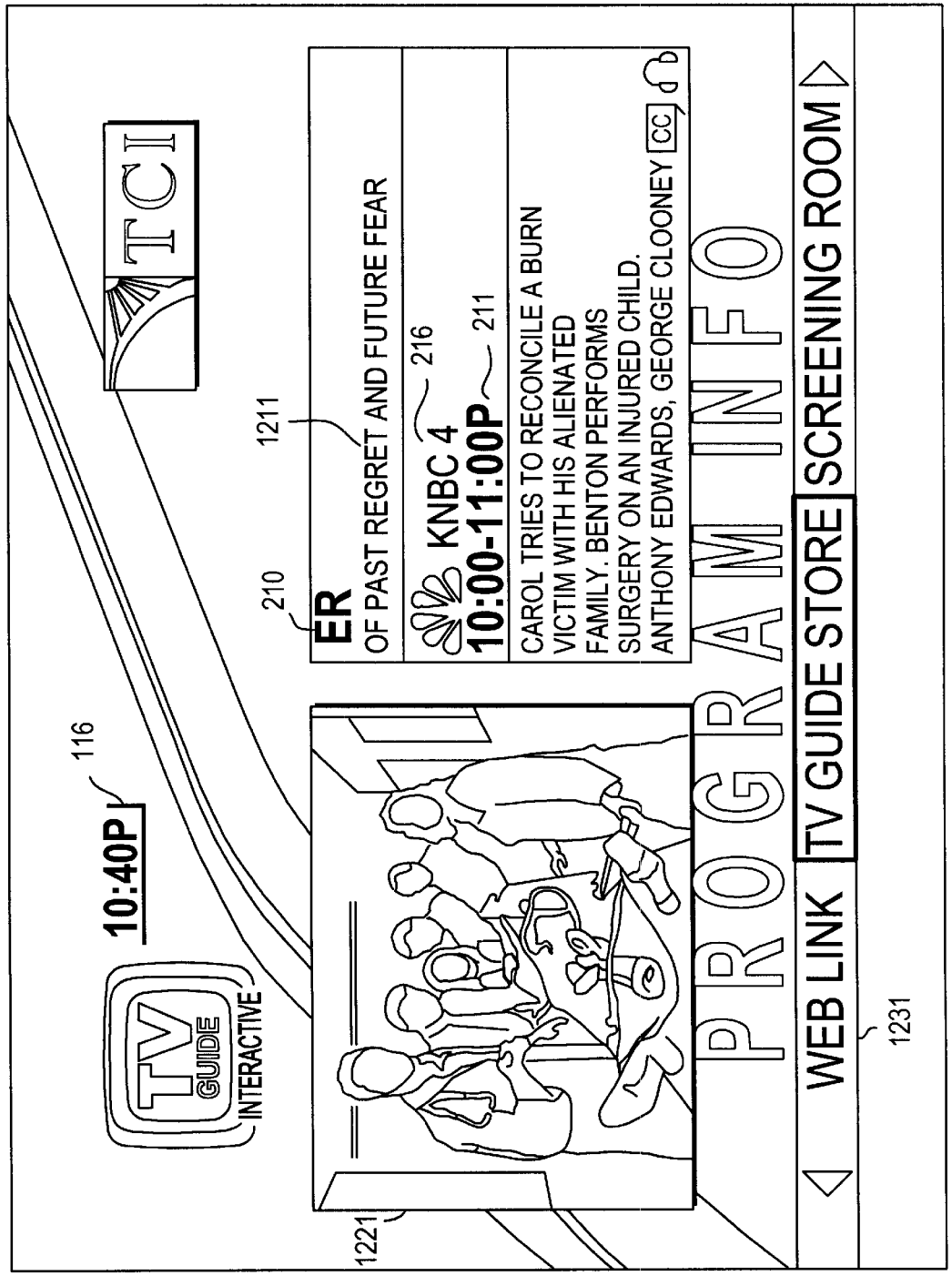

FIG. 13 shows an illustrative program information screen with additional program guide features. The program guide may provide the user with the opportunity to, for example, access a web link that may be related to the program associated with the selected program listing, shop at a TV Guide store and order products that are related to the program preview pay-per-views.

FIG. 14 is an illustrative program guide display screen 1400 that may be generated by the program guide in response to a user indicating that the user desires to shop in a TV Guide store. The TV Guide store screen 1400 of FIG. 14 may contain a number of graphics 1411 that indicate products for sale. The TV Guide store screen may also contain selectable product information 1521 that briefly describes the product.

If desired, the product graphics may also be selectable.

Screen 1400 may be accessed from program information screen 1200 of FIG. 13 and show products related to the selected program. Alternatively, screen 1400 may be accessed from main menu 100 and show a wider selection of products (e.g., products not related to the program for which information is displayed). Interactive program guide systems in which users are provided with an opportunity to order products are described, for example, in Ellis et al. U.S. patent application Ser. No. 08/428,809, filed Apr. 24, 1995, which is hereby incorporated by reference herein in its entirety.

Figure 15:
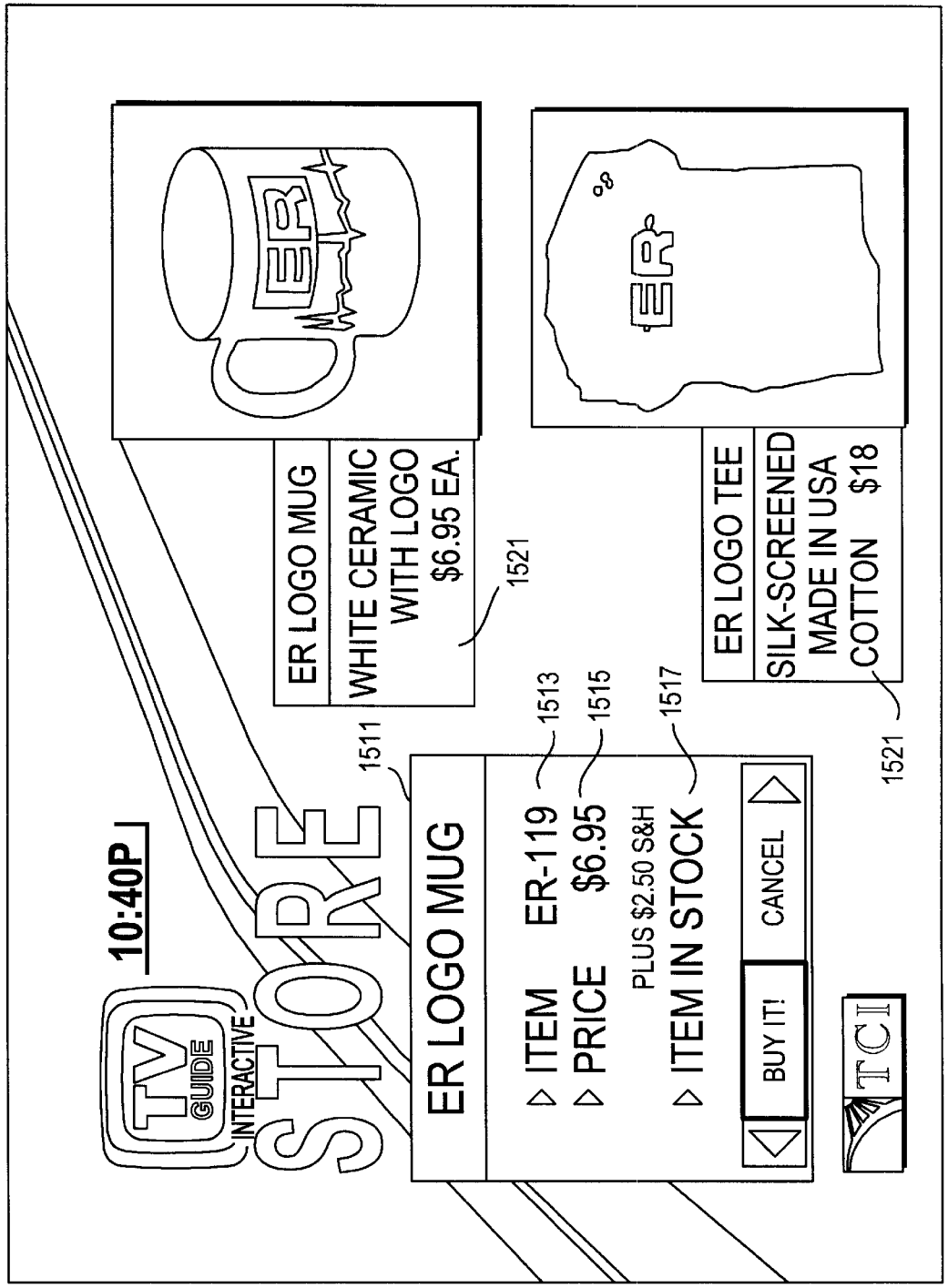

The program guide may, for example, update the display screen with ordering information in response to the user selection of a product, as shown in FIG. 15. The ordering information may include an item name 1511, item number 1513, price 1515, an indication of whether the item is in stock 1517, or any other suitable ordering information. The program guide may also provide the user with an opportunity to purchase the selected product by, for example, selecting an on screen "buy it?" button.

Figure 16:
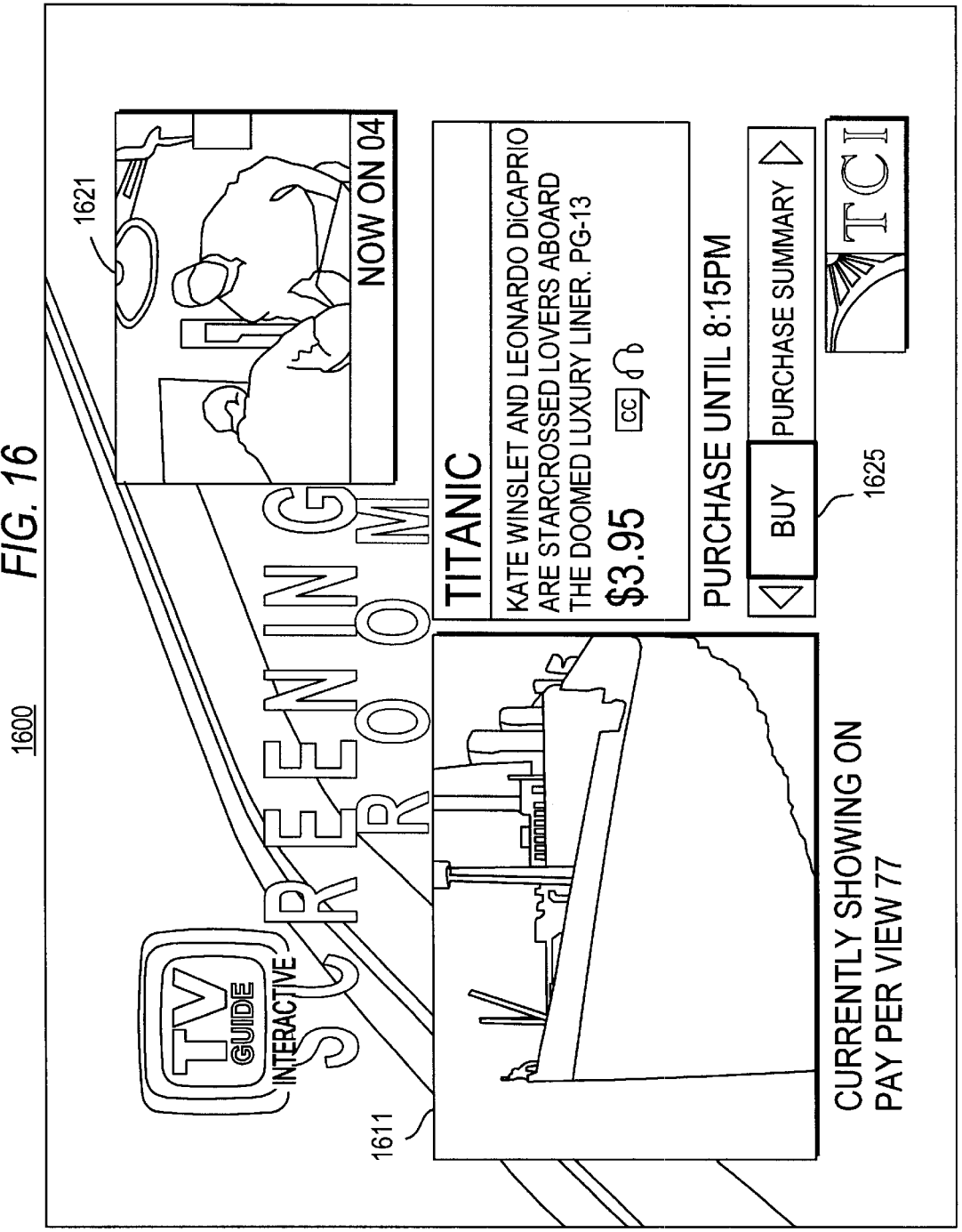
FIG. 16 shows an illustrative screening room display screen in accordance with the principles of the present invention.

FIG. 16 shows an illustrative program guide display screen 1600 that the program guide may generate for display in response to an indication by the user that the user desires to access the screening room feature. The screening room display screen may contain, for example, a preview video clip 1611 of a video (e.g., a pay-per-view program) from a video library stored, for example, at main facility 12 or at program guide distribution facility 16. Alternatively, video window 1611 may display real-time streamed video such as, for example, infomercials. In still another suitable approach, video window 1611 may display portions of a program being broadcast. The screening room 1600 may also display a video window 1621 of the programming on the current channel thereby providing the user with the opportunity to view television programming while accessing the screening room. The display screen may also display the title of the previewed video, a brief description of the video (or other information), and ordering information (if applicable) for the previewed video.

Screen 1600 may be accessed, for example, from program information screen 1200 of FIG. 13 and display a video clip of the selected program. Alternatively, screen 1600 may be accessed from main menu 100 and provide the user with an opportunity to select from list of programs a program for which a video clip is displayed. Video clips may be provided using a suitable client-server based approach. Alternatively, a non-client-server based approach may be used, such as the approach described in Easterbrook et al. U.S. patent application Ser. No. 09/370,400, filed Aug. 5, 1999, which is hereby incorporated by reference herein in its entirety.

Figure 17:
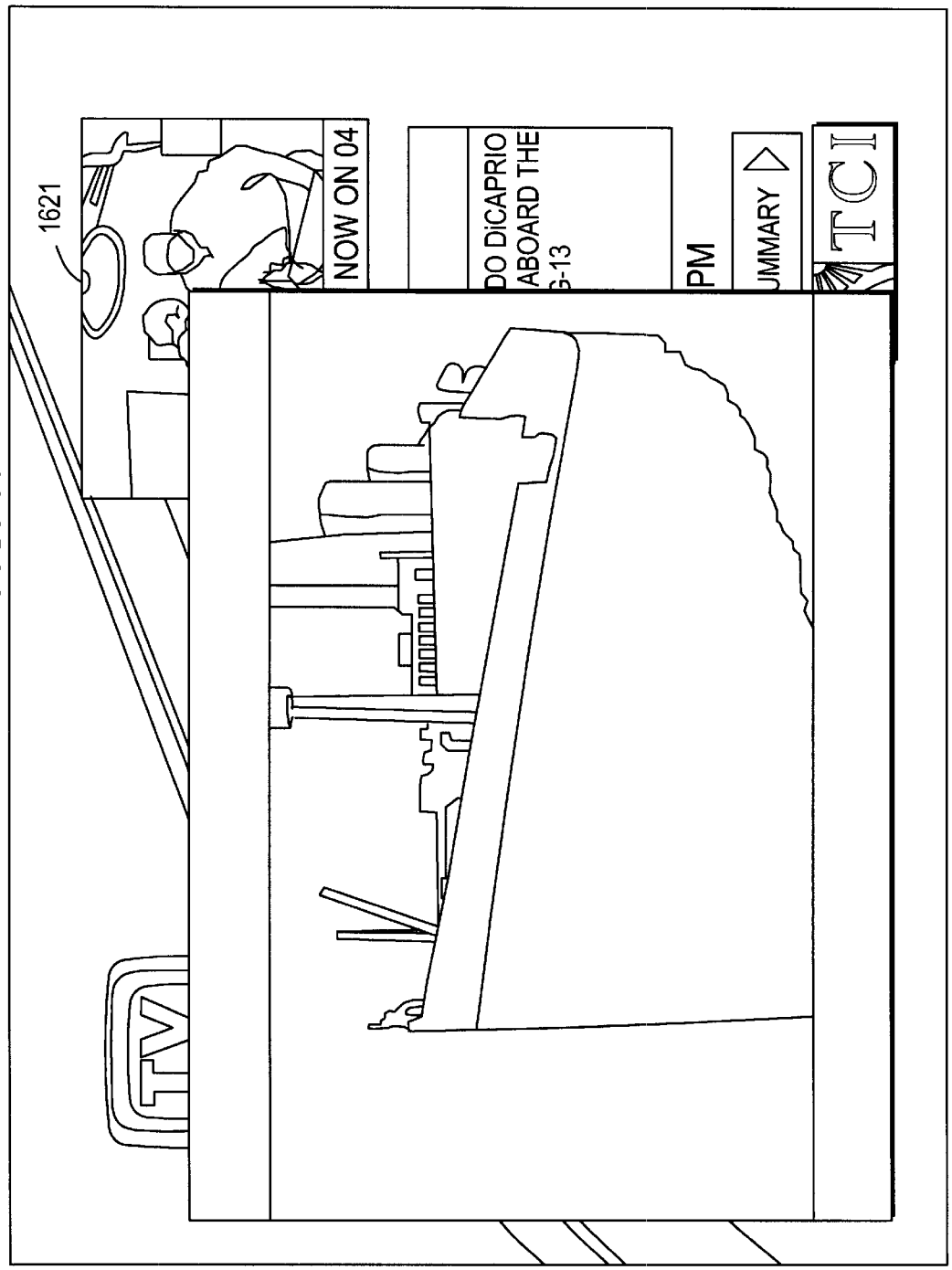
FIG. 17 shows an action shot of the video window of FIG. 16 as it is exploded to full-screen size in accordance with the principles of the present invention.

The program guide may provide the user with the opportunity to purchase the previewed video by selecting, for example, an on screen "buy" option 1625. In response to the purchase of the previewed video, the program guide may immediately display the purchased programming for the user if the video is currently being aired on a channel. The program guide may, for example, explode the displayed video preview window into a full screen video. FIG. 17 is an action shot of the program guide exploding the video preview into a full screen video after purchase. After the window is exploded, it is displayed in full-screen. In another suitable approach, the guide may display the previewed program in video window 1611. If the user does not order the previewed program within a predefined period of time, the guide may revert to displaying a video clip. If the user purchases the previewed program, the guide may explode the video window and allow the user to continue to watch the previewed program in full-screen.

In one suitable approach, the screening room may allow the user to preview the first few minutes (e.g., five minutes) of a program. The program may be a program currently aired on a channel to which the guide has tuned (e.g., using a second tuner), or a program being provided using a suitable video-on-demand scheme. The user may indicate a desire to purchase the program any time within the preview. After the user indicates a desire to purchase the program, video window 1611 may explode to a full-screen and the user may continue to watch the program.

In another suitable approach, video window 1611 may play a trailer for a program. The trailer may be currently aired (e.g., on a barker channel or on the channel of the promoted program just before the program airs), or may be provided using a suitable video-on-demand approach. A non-client-server based approach, such as that described in above-mentioned Easterbrook et al. U.S. patent application Ser. No. 09/370,400, filed Aug. 5, 1999, may be used if desired. In response to the user indicating a desire to purchase the promoted program, the guide may, for example, explode video window 1611 to a full screen, finish playing the trailer, and then display the purchased program. Alternatively, the guide may freeze the trailer, explode video window 1611 into full-screen, and then begin playing the purchased program.

In still another suitable approach, the guide may provide an "any time free preview" feature. The guide may display the currently aired featured program in video window 1611, thereby allowing the user to preview a program from its current point. After a predefined period of time (e.g., five minutes), the guide may stop the preview and display a trailer if the user has not purchased the program. If the user purchases the program, the guide may explode video window 1611 to a full-screen size and allow the user to continue viewing the program.

Figure 18:
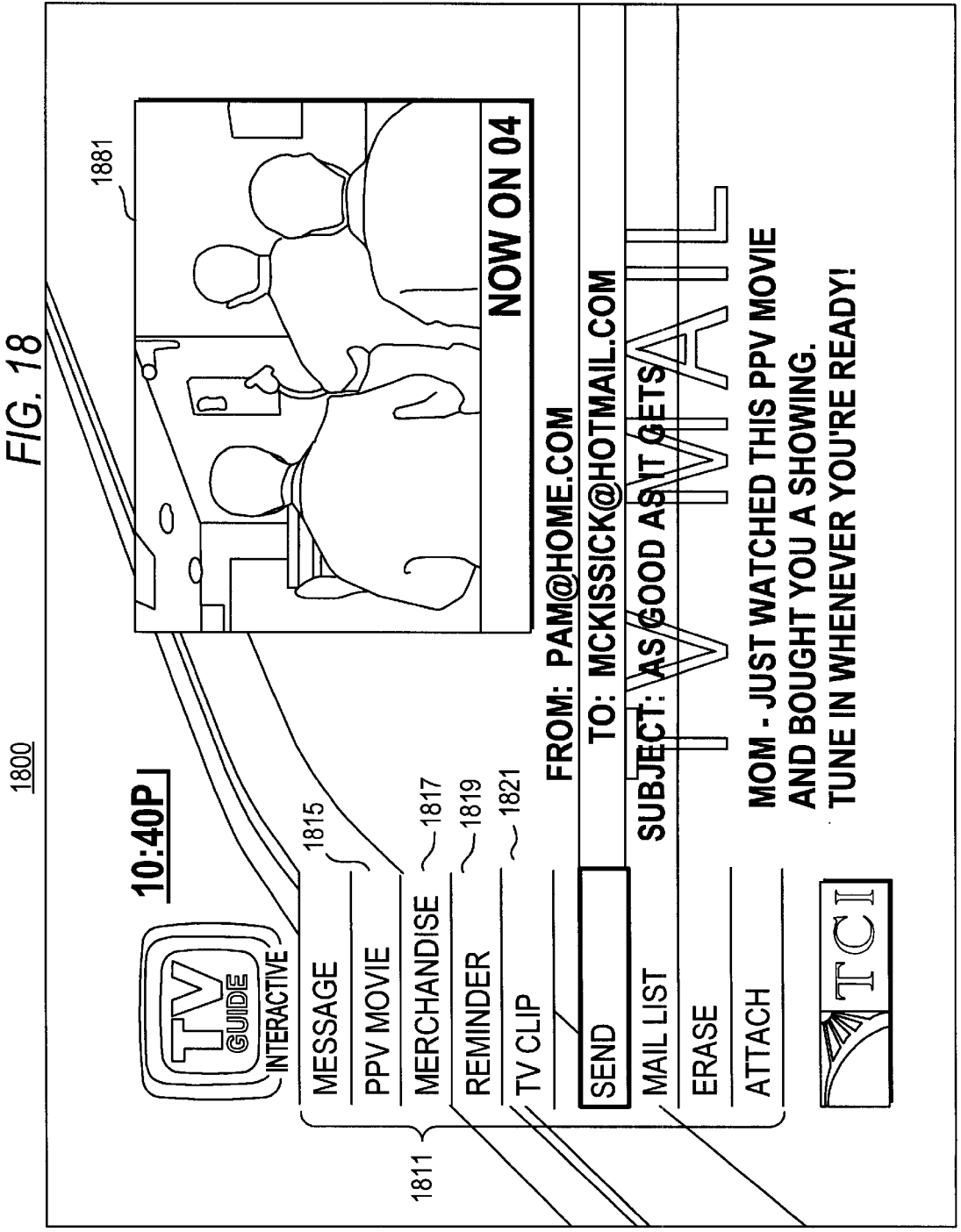
FIG. 18 is an illustrative TV Mail display screen in accordance with the principles of the present invention.

FIG. 18 is an illustrative display screen 1800 that the program guide may generate for display in response to an indication by the user that the user desires to access the TV Mail feature of the program guide (e.g., by selecting "TV Mail" from menu 102 of FIG. 5). The TV Mail screen 1800 of FIG. 18 may contain a video portion 1881 in which the television programming on the current channel is displayed to provide the user with the opportunity to watch television programming while accessing the TV Mail feature. The TV Mail screen of FIG. 18 may also include a selectable list of program guide features 1811. The program guide may, for example, provide the user with an opportunity to compose TV Mail messages, send pay-per-view movies, send merchandise from the TV Guide store, send programming reminders, send video clips, or send any other television programming related information to another person.

In response to a user selection of the "PPV Movie" feature 1815 the program guide may, for example, provide the user with an opportunity to order a pay-per-view for someone else. The authorization for the pay-per-view may be sent as part of a TV Mail message, or may be sent by a program guide distribution facility directly to the television equipment of the person receiving the pay-per-view. Once the person receiving the message accesses it, the person's equipment (e.g., set-top box, personal computer, etc.) may access the pay-per-view authorization information and give that person access to the pay-per-view. The TV Mail message may be displayed for the person if the person accesses the pay-per-view channel before reading the message. Interactive television program guide systems that provide TV Mail features are described, for example, in McKissick et al. U.S. patent application Ser. No. 09/356,245, filed Jul. 16, 1999, which is hereby incorporated by reference herein in its entirety.

In response to a user selection of the "Merchandise" feature 1817 the program guide may, for example, provide the user with the opportunity to order merchandise from a TV Guide store for someone else. Upon ordering, the program guide may provide the user with the opportunity to enter a shipping address to which the ordered merchandise is sent.

In response to a user selection of the "Reminder" feature 1819 the program guide may, for example, provide the user with the opportunity to send a programming reminder to someone else. The reminder may, for example, be encapsulated as a TV Mail message that is sent to someone else's television equipment according to a TV Mail address (e.g., a standard e-mail address). Once received the program guide may display the reminder shortly before a program starts. The reminder may include, for example, a short message reminding the user that the program is about to start and may provide the user with an opportunity to tune to the program.

In response to a user selection of the "TV Clip" feature 1821 the program guide may, for example, provide the user with the opportunity to send a television programming video clip or still frame to someone else. The video clip may be stored in a video clip library (e.g., the screening room) that may be stored at main facility 12 or at a program guide distribution facility 16. The video clip may be temporarily stored in digital form on a storage device or in memory, either of which may be part of the user's equipment (e.g., set-top box, personal computer, etc.). Interactive television program guide systems that store program guide data and programs on digital storage devices are described, for example, in above-mentioned Hassell et al. U.S. patent application Ser. No. 09/157,256, filed Sep. 17, 1998.

The clip may be attached to a TV Mail message that may also be sent to the other person using, for example, a standard TV Mail (e.g., e-mail) address. Alternatively, the program guide may send a reference to the video clip, such as a clip identifier or the location of the clip. The receiving party may access the clip, for example, from the screening room when reading TV Mail.

Figure 19:
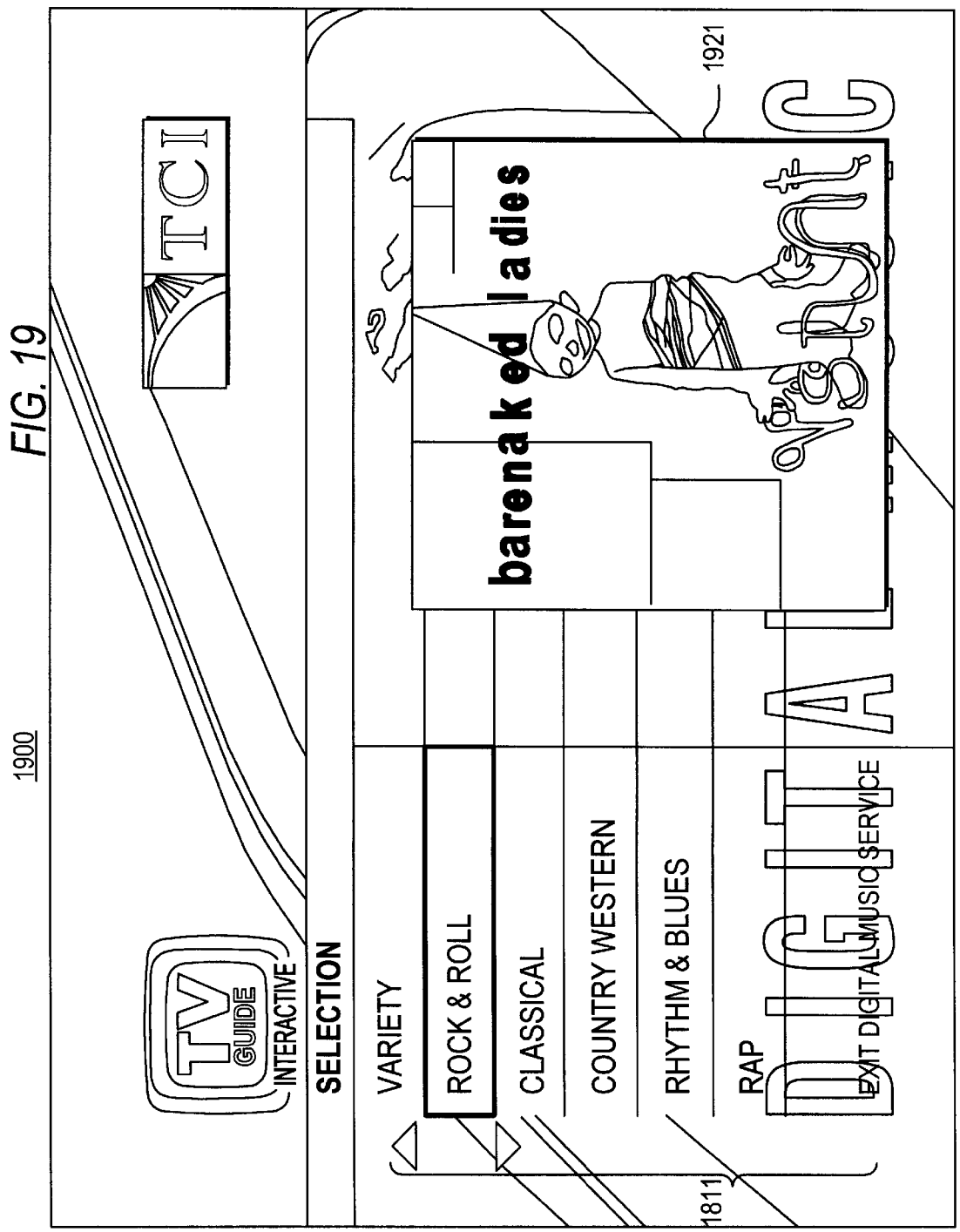
FIG. 19 shows an illustrative display screen for providing users with access to digital music channels in accordance with the principles of the present invention.

FIG. 19 shows an illustrative program guide display screen 1900 for providing a user with access to a digital music channel. The display screen may, for example, include a selectable list 1911 of digital music channels sorted by theme. When a particular theme is selected by the user, music from the corresponding digital music channel is played in the background. The display screen may also include, for example, a graphic 1921 showing the album from which the music is played.

FIGS. 20 and 21 show illustrative program guide display screens 2000 and 2100, respectively, for providing a user with weather information while still allowing the user to view television programming. The display screens may include a video portion 2010 displaying the television programming playing on the current channel, a product brand graphic, a cable provider graphic, a weather map graphic, and a graphic displaying the current weather conditions (as shown in FIG. 20). In response to the user indicating a desire to access a local weather forecast (e.g., by selecting a current weather conditions graphic 2021, selectable forecast feature 2025, or other graphic or feature), the program guide may display a local forecast graphic 2027 as shown in FIG. 21.

The foregoing is merely illustrative of the principles of this invention and various modifications can be made by those skilled in the art without departing from the scope and spirit of the invention.

What is claimed is:

1. A method for providing users of an interactive television program guide system with opportunities to preview programs, comprising:
    displaying a video window in a portion of a display screen, wherein the video window contains television related video;
    providing a user with an opportunity to purchase a program associated with the television related video; and
    exploding the video window and its television related video into full-screen size in response to the user purchasing the program such that the user may perceive intermediate sizes of the video window and its television related video.

2. The method defined in claim 1 wherein:
    displaying a video window in a portion of a display screen comprises displaying a first video window in a first portion of a display screen; and
    the method further comprises displaying a second video window in a second portion of the screen, wherein the second video window is displayed simultaneously with the first video window and contains a television program currently aired on a television channel.

3. The method defined in claim 1 wherein:
    displaying a video window in a portion of a display screen comprises displaying a video window that contains a trailer for a pay-per-view program in a portion of a display screen; and
    exploding the video window into full-screen size in response to the user purchasing the program comprises:
        exploding the video window that contains the trailer for the pay-per-view program into full-screen size; and
        displaying the pay-per-view program in full-screen size when the trailer for the pay-per-view program is finished.

4. The method defined in claim 1 wherein:
    displaying a video window in a portion of a display screen comprises displaying a video window that contains a trailer for a pay-per-view program in a portion of a display screen; and
    exploding the video window into full-screen size in response to the user purchasing the program comprises:
        exploding the video window that contains the trailer for the pay-per-view program into full-screen size;
        freezing the display of the trailer for the pay-per-view program; and
        displaying the pay-per-view program in full-screen size.

5. The method defined in claim 1 wherein:
    displaying a video window in a portion of a display screen comprises displaying a video window that contains a pay-per-view program in a portion of a display screen;
    providing a user with an opportunity to purchase a program comprises providing the user with an opportunity to purchase the pay-per-view program; and
    exploding the video window into full-screen size in response to the user purchasing the program comprises exploding the video window into full-screen size in response to the user purchasing the pay-per-view program.

6. The method defined in claim 5 wherein displaying a video window containing a pay-per-view program in a portion of a display screen comprises displaying a video window containing the beginning of the pay-per-view program in a portion of the display screen.

7. An interactive television program guide system in which users are provided with opportunities to preview programs, comprising:
    means for displaying a video window in a portion of a display screen, wherein the video window contains television related video;
    means for providing a user with an opportunity to purchase a program associated with the television related video; and
    means for exploding the video window and its television related video into full-screen size in response to the user purchasing the program such that the user may perceive intermediate sizes of the video window and its television related video.

8. The system defined in claim 7 wherein:
    the means for displaying a video window in a portion of a display screen comprises means for displaying a first video window in a first portion of a display screen; and
    the system further comprises means for displaying a second video window in a second portion of the screen, wherein the second video window is displayed simultaneously with the first video window and contains a television program currently aired on a television channel.

9. The system defined in claim 7 wherein:
    the means for displaying a video window in a portion of a display screen comprises means for displaying a video window that contains a trailer for a pay-per-view program in a portion of a display screen; and the means for exploding the video window into full-screen size in response to the user purchasing the program comprises:
  means for exploding the video window that contains the trailer for the pay-per-view program into full-screen size; and
  means for displaying the pay-per-view program in full-screen size when the trailer for the pay-per-view program is finished.

10. The system defined in claim 7 wherein:
the means for displaying a video window in a portion of a display screen comprises means for displaying a video window that contains a trailer for a pay-per-view program in a portion of a display screen; and
the means for exploding the video window into full-screen size in response to the user purchasing the program comprises:
  means for exploding the video window that contains the trailer for the pay-per-view program into full-screen size;
  means for freezing the display of the trailer for the pay-per-view program; and
  means for displaying the pay-per-view program in full-screen size.

11. The system defined in claim 7 wherein:
the means for displaying a video window in a portion of a display screen comprises means for displaying a video window that contains a pay-per-view program in a portion of a display screen;
the means for providing a user with an opportunity to purchase a program comprises means for providing the user with an opportunity to purchase the pay-per-view program; and
the means for exploding the video window into full-screen size in response to the user purchasing the program comprises means for exploding the video window into full-screen size in response to the user purchasing the pay-per-view program.

12. The system defined in claim 11 wherein the means for displaying a video window containing a pay-per-view program in a portion of a display screen comprises means for displaying a video window containing the beginning of the pay-per-view program in a portion of the display screen.

13. An interactive television program guide system in which users are provided with opportunities to preview programs, comprising:
  distribution equipment configured to provide program guide data and programs; and
  control circuitry on which an interactive television program guide is at least partially implemented, wherein the interactive television program guide is programmed to: (1) display a video window in a portion of a display screen, wherein the video window contains television related video, (2) provide a user with an opportunity to purchase a program associated with the television related video, and (3) explode the video window and its television related video into full-screen size in response to the user purchasing the program such that the user may perceive intermediate sizes of the video window and its television related video.

14. The system defined in claim 13 wherein the interactive television program guide is further programmed to: (1) display a first video window in a first portion of a display screen, and (2) display a second video window in a second portion of the screen, wherein the second video window is displayed simultaneously with the first video window and contains a television program currently aired on a television channel.

15. The system defined in claim 13 wherein the interactive television program guide is further programmed to: (1) display a video window that contains a trailer for a pay-per-view program in a portion of a display screen, (2) explode the video window that contains the trailer for the pay-per-view program into full-screen size, and (3) display the pay-per-view program in full-screen size when the trailer for the pay-per-view program is finished.

16. The system defined in claim 13 wherein the interactive television program guide is further programmed to: (1) display a video window that contains a trailer for a pay-per-view program in a portion of a display screen, (2) explode the video window that contains the trailer for the pay-per-view program into full-screen size, (3) freeze the display of the trailer for the pay-per-view program, and (4) display the pay-per-view program in full-screen size.

17. The system defined in claim 13 wherein the interactive television program guide is further programmed to: (1) display a video window that contains a pay-per-view program in a portion of a display screen, (2) provide the user with an opportunity to purchase the pay-per-view program, and (3) explode the video window into full-screen size in response to the user purchasing the pay-per-view program.

18. The system defined in claim 17 wherein the interactive television program guide is further programmed to display a video window containing the beginning of the pay-per-view program in a portion of the display screen.

19. A computer-readable storage medium storing instructions that, when executed on equipment included in an interactive television program guide system that is configured to read and execute the instructions, cause the interactive television program guide system to perform a method for providing users of the interactive television program guide system with opportunities to preview programs, the method comprising:
  displaying a video window in a portion of a display screen, wherein the video window contains television related video;
  providing a user with an opportunity to purchase a program associated with the television related video; and
  exploding the video window and its television related video into full-screen size in response to the user purchasing the program such that the user may perceive intermediate sizes of the video window and its television related video.

20. The computer-readable storage medium defined in claim 19, wherein:
  the method for displaying a video window in a portion of a display screen comprises displaying a first video window in a first portion of a display screen; and
  the method further comprises displaying a second video window in a second portion of the screen, wherein the second video window is displayed simultaneously with the first video window and contains a television program currently aired on a television channel.

21. The computer-readable storage medium defined in claim 19, wherein:
  the method for displaying a video window in a portion of a display screen comprises displaying a video window that contains a trailer for a pay-per-view program in a portion of a display screen; and
  the method for exploding the video window into full-screen size in response to the user purchasing the program comprises:
    exploding the video window that contains the trailer for the pay-per-view program into full-screen size; and displaying the pay-per-view program in full-screen size when the trailer for the pay-per-view program is finished.

22. The computer-readable storage medium defined in claim 19, wherein:

the method for displaying a video window in a portion of a display screen comprises displaying a video window that contains a trailer for a pay-per-view program in a portion of a display screen; and the method for exploding the video window into full-screen size in response to the user purchasing the program comprises:

exploding the video window that contains the trailer for the pay-per-view program into full-screen size;

freezing the display of the trailer for the pay-per-view program; and displaying the pay-per-view program in full-screen size.

23. The computer-readable storage medium defined in claim 19, wherein:

the method for displaying a video window in a portion of a display screen comprises displaying a video window that contains a pay-per-view program in a portion of a display screen;

the method for providing a user with an opportunity to purchase a program comprises providing the user with an opportunity to purchase the pay-per-view program; and the method for exploding the video window into full-screen size in response to the user purchasing the program comprises exploding the video window into full-screen size in response to the user purchasing the pay-per-view program.

24. The computer-readable storage medium defined in claim 23 wherein the method for displaying a video window containing a pay-per-view program in a portion of a display screen comprises displaying a video window containing the beginning of the pay-per-view program in a portion of the display screen.

* * * * *